United States Patent
Minami et al.

(10) Patent No.: US 6,380,986 B1
(45) Date of Patent: Apr. 30, 2002

(54) MOTION VECTOR SEARCH METHOD AND APPARATUS

(75) Inventors: Toshihiro Minami; Toshio Kondo; Ken Nakamura; Mitsuo Ikeda; Takeshi Yoshitome; Takeshi Ogura, all of Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/310,148

(22) Filed: May 12, 1999

(30) Foreign Application Priority Data

May 19, 1998 (JP) .......................................... 10-136287
Jul. 17, 1998 (JP) .......................................... 10-202628

(51) Int. Cl.$^7$ ................................................. H04N 7/36
(52) U.S. Cl. .................. 348/699; 375/240.16; 382/107; 382/236
(58) Field of Search ..................... 348/699; 375/240.16, 375/240.17; 382/107, 236; H04N 7/36

(56) References Cited

U.S. PATENT DOCUMENTS 5,619,268 A * 4/1997 Kobayashi et al. ......... 348/699
6,249,612 B1 * 6/2001 Ogura ........................ 348/699

FOREIGN PATENT DOCUMENTS

| JP | 03-129984 | 6/1991 |
| JP | 04-003595 | 1/1992 |
| JP | 05-328333 | 12/1993 |
| JP | 09-163380 | 6/1997 |
| JP | 09-212649 | 8/1997 |
| JP | 10-098730 | 4/1998 |
| JP | 10-262258 | 9/1998 |

OTHER PUBLICATIONS

N. Hayashi, et al., "A Bidrectional Motion Compensation LSI with a Compact Motion Estimator," *IEICE Trans. Electron*, E78–C, 12, pp. 1682–1690, Dec. 1995.

K. Nitta, et al., "MPEG–2 Video Encoder LSI–ME/MC Architecture for Scene–Adaptive Control," Preceding of the 1999 IEICE General Conference, pp. 139, Mar. 1999.

K. Nitta, et al., "Motion estimation/motion compensation hardware architecture for a scene–adaptive algorithm on a single–chip MPEG2 MP@ML video encoder," Part of the IS&T/SPIE Conference on Visual Communications and Image Processing '99, vol. 3653, pp. 874–882, Jan. 1999.

E. Ogura, et al., "A 1.2W Single–Chip MPEG2 MP@ML Video Encoder LSI including Wide Search Range Motion Estimation and 81 MOPS Controller," *ISSCC98 Digest of Technical Papers*, Feb. 1998.

K. Suguri, et al., "A real–time motion estimation and compensation LSI with wide search range for MPEG2 video encoding," *IEEE J. Solid–State Circuits*, vol. 31, No. 11, pp. 1733–1741, Nov. 1996.

(List continued on next page.)

*Primary Examiner*—Howard Britton
(74) *Attorney, Agent, or Firm*—Burns Doane Swecker & Mathis LLP

(57) ABSTRACT

A method of obtaining a motion vector in moving images is based on evaluation of computational results of searches made by matching a target template and a group of pixel blocks each having a same size as the target template. The steps include: 1) searching in a wide area and obtaining a reference vector to indicate an overall image movement; 2) searching in narrow areas centered about the reference vector for all templates in the target image, and obtaining a displacement vector for each template in relation to the reference vector; and 3) summing the reference vector and the displacement vector for each template, and assigning a computed result as a motion vector in each template.

25 Claims, 24 Drawing Sheets

OTHER PUBLICATIONS

K. Yang, et al., "A Family of VLSI Designs for the Motion Compensation Block–Matching Algorithm," *IEEE Trans. CAS*, vol. 36, No. 10, pp. 1317–1325, Oct. 1989.

Y. Yokoyama et al., "Search Window Shifting for Video Encoder LSI," Proceding of the 1998 IEICE General Conference, pp. 40, Mar. 1998.

S. Zhu, et al., "Video Quality Improvement by Search Window Shifting in Motion Estimation," Preceding of the 1997 IEICE General Conference, pp. 306, Mar. 1997.

* cited by examiner

MOTION VECTOR SEARCH METHOD AND APPARATUS

BACKGROUND OF THE INVENTION

1. Field of the Invention

The present invention relates to a technology used for inter-frame video encoding, and relates in particular to a motion vector search method and apparatus for determining a motion vector to indicate a movement of a pixel block in one image to a location in another image, and a computer program product to execute motion vector search.

This application is based on patent application No. Hei 10-136287 and Hei 10-202628 filed in Japan, the contents of which are incorporated herein by reference.

2. Description of the Related Art

Various conventional motion vector search methods will be described in the following with reference to schematic diagrams.

FIG. 11 shows a schematic diagram of a template 1 that is selected for obtaining a motion vector and a search area 2 in which to search for a motion vector. Template 1 is a pixel block in a target image to be matched, search area 2 is a pixel block in another image, which is larger than the template 1, to be compared against the target image. White triangles 3 refer to pixels in the template 1 and white circles refer to pixels in the search area 2.

In FIG. 11, template 1 is superimposed over the search area 2, therefore, white circle pixels 4 that are overlapped in the search area are not indicated. In the following presentation, horizontal pixels are referred as pixels, and vertical pixels are referred as lines, so that template 1 shown in FIG. 11 is described as 4 pixels×4 lines, and the search area 2 is described as 11 pixels×11 lines.

A first conventional method of searching for a motion vector using template 1 is the exhaustive search method. In this method, a template 1 comprised by 4 pixels×4 lines is used to successively search a search area 2 that is larger than the template size, and the values of each pixel in the sampled areas are calculated with the values of the corresponding pixels in the reference image, in terms of some search parameter such as the absolute value of the differences or squares of differences, and a sum of the chosen search parameter of each pixel in the sampled areas is obtained for each sampled area.

Specifically, the template 1 begins a search from left top to the right bottom in the search area 2 by shifting one pixel or by one line for each sampling, and since the search area 2 is comprised by 11 pixels×11 lines, and the template is 4 pixels×4 lines, a total of 8×8=64 sample areas are subjected to analysis in terms of the absolute value of the differences or squares of the differences between the template 1 and the sample area. A motion vector is then determined and a location in a target area having the minimum computed value of the chosen search parameter.

In FIG. 11, if it is supposed that the motion vector of a pixel block of template 1 is described by the zero motion vector (0, 0), then, a possible range of values that the motion vector can have is [−4~+3] in both horizontal and vertical directions, respectively. This is because, as can be seen in FIG. 11, template 1 is able to move four pixels (or four lines) in one direction (left and top) and similarly, template 1 is able to move three pixels (or three lines) in the opposite direction (right and bottom).

And, for example, if it is assumed that the minimum computed value (sum of absolute value of differences or sum of squares of the differences) is obtained in pixel block 5, then the motion vector V is (−2, −2). This is a numerical illustration of the principle of obtaining a motion vector, but a general approach to vector search will be explained with reference to FIG. 12.

The size of a template 6 in a target image is described by "a pixels×b lines", and the size of search area 7 in a comparison (reference) image is described by "c pixels×d lines", where $c \geq a$, $d \geq b$. Suppose that the motion vector of the center pixel block in the search area 7 corresponding to template 6 is [(0, 0)], then, possible range of motion vector 6 is given by [−(c−a+1)/2~(c−a)/2 horizontal; −(d−b+1)/2~(d−b)/2 vertical], and it is necessary to evaluate [(c−a+1)×(d−b+1)] pieces of motion vectors.

In the case shown in FIG. 12, a motion vector for the pixel block 8 at the left upper corner is described by [−(c−a+1)/2, −(d−b+1)/2)], and a motion vector for the right lower corner pixel block 9 is described by [(c−a)/2, (d−b)/2]. Motion vector search parameters referred to in the following presentation are always those that are determined based on a sum of the absolute values of differences. It is, of course, permissible to choose a sum of squares of differences as the search parameter.

When the exhaustive search method is employed, the search area 2 shown in FIG. 11 requires an absolute value of differences to be calculated 64×16=1024 times (sampling 64 pieces of areas each comprised by 16 pixels), requiring a vast amount of computation. So, to reduce the amount of computation, a second conventional technique of determining a motion vector is known. First, movements are evaluated on a reduced size image obtained by sub-sampling, and then the motion vector thus obtained is used as an initial value of the motion vector to carry out further searches in small areas only.

The second conventional technique will be explained with reference to FIG. 13. FIG. 13 shows those pixels 10, 11 to be matched using sub-sampling size of 2 pixels×2 lines, where black triangles 10 represent pixels in template 1 in a reference image and black circles 11 represent corresponding target pixels in the search area 2 to be sampled.

First, a reduced image is obtained by sub-sampling, and an absolute value of differences is calculated 16×4=64 times (16 sub-sampling of an area having 4 pixels) in the reduced image. Compared with the first conventional technique, the amount of processing required in this technique is reduced by 1/16. However, to search a range of [−1~+1] pixels about the initial values in the reference (comparison) image, absolute value of differences must be computed 9×16=144 times. Therefore, the total number of computations is 208 (=64+144), and the total number of computations is reduced considerably compared with the exhaustive search technique.

Details regarding motion vector search techniques are described, for example, in "A bidirectional motion compensation LSI with a compact motion estimator", by N. Hayashi, et. al., IEICE Trans. Electron, E78-C, 12, pp. 1682–1690, Dec., 1995.

By combining the second conventional technique and the most advance LSI technology, it is possible to implement a search range of [−128~+128 horizontal; −64~+64 vertical] pixels in one integrated device to obtain good quality video images of normal activity levels, and thereby realizing low manufacturing cost.

However, for moving images at higher speeds such as sports broadcasting, it is necessary to carry out searches over a range of [−200~+200 horizontal; −100~+100 vertical]

pixels. Such a motion vector search apparatus capable of searching over a wide area is described in a reference, for example, E. Ogura et. al., "A 1.2 W Single-Chip MPEG2 MP@ML Video Encoder LSI including Wide Search Range Motion Estimation and 81 MOSP Controller", ISSCC98 Digest of Technical Papers, February., 1998. Incidentally, search range in this reference is [−288~+287.5 horizontal; −96~+95.5 vertical] pixels.

To realize such a vast search area, a technique may be considered in which one pixel is extracted from 4 pixels×2 lines or 4 pixels×4 lines to obtain a reduced image having a reduced resolution. However, the lesser the resolution the higher the error for motion vectors so that the image quality is inferior in images depicting small movements, compared with images obtained by searching over a small area using either the first or second technique.

For this reason, a third technique of searching in a wide area has been suggested, in which the wide search area is divided into several smaller areas and a separate motion vector search apparatus is allocated for each divided individual area.

This technique will be explained with reference to FIG. 14. FIG. 14 is a schematic diagram showing a template 13 to be used for obtaining motion vectors and a target search area 12 to search for motion vectors. Motion vectors can have a range of [−8~+7] pixels in both horizontal and vertical directions, and the search area 12 has 19 pixels×19 lines so that the template 13 must evaluate 16×16=256 search areas, and compute absolute values of differences, in an area four times the area required in FIG. 11.

In this technique, the motion vector search apparatus is required to have four times the computational power compared with the case such as possible values of motion vector are in a range of [−4~+3] pixels in the horizontal and vertical directions, respectively. If the total area is divided in four areas 14, 15, 16, 17 whose edges are overlapped, and if the four areas are searched by four separate apparatuses, then four apparatuses, each having a capability of computing sum of an absolute value of differences in 64 areas, can compute sum of an absolute value of differences in 256 areas.

Details of this technique are described, for example, in "A family of VLSI Designs for the Motion Compensation Block-Matching Algorithm", by K. Yang et. al., IEEE Trans. CAS, pp.1317~1325, Oct., 1989.

However, in the third technique, as the search area increases, computational power must be correspondingly increased, resulting in increased operational cost. So, a fourth conventional technique has been proposed so that the apparent search area can be increased without increasing the operational cost.

The fourth conventional technique is based on that it would be possible to estimate the movement of the overall image with some probability, by examining the distribution of motion vectors that have been encoded in the past, because moving images on the screen are continual. In such a case, the center of search can be shifted towards the estimated movement direction. This method will be explained with reference to FIG. 15.

FIG. 15 shows a process of searching by anticipating that the overall image movement will be in the direction of (−2, −3) are searched, so that areas centered about a pixel block 19 corresponding to a motion vector (−2, −3). In other words, searches for a motion vector will be conducted in a search area over a range of [−6~+1] horizontal and [−7~0] vertical in relation to a reference pixel block 13. In relation to the shifted pixel block 19, the search area 18 is the same as searching an area over a range of [−4~+3] in horizontal and vertical directions. This technique allows searches over an apparent wide area without increasing the computational requirement, when the moving images are moving in one direction such as towards the right or top in continual images.

Details of this method are described, for example, in "Video Quality Improvement by Search Window Shifting", by S. Zhu et. al., Proceeding of the 1997 IEICE General Conference, p. 306, 1997.

Furthermore, although discussions so far have dealt only with computational volume, there is also another problem that when the search area is expanded the number of pixels is correspondingly increased. A typical configuration of a motion vector search apparatus is shown in FIG. 16.

Data on the template and search area are stored in an image memory 24 external to the motion vector search apparatus 20, and are transferred to template memory 22 and search area memory 23 in the apparatus 20, when they are needed for movement detection, and they are forwarded to a processing device 21 for computing a sum of the absolute values of differences and a minimum detected value.

Normally, internal pixel transfer rate is high within the motion vector search apparatus 20, i.e., between the template memory 22 and the processing device 21 and between search area memory 23 and the processing device 21, but external transfer rate is slow, i.e., between the template memory 22 and image memory 24, and between search area memory 23 and image memory 24.

In designing a motion vector search apparatus 20, data transfer rate between the template memory 22 and image memory 24 presents no particular problem, because the number of pixels in a template is low, but it is necessary to minimize the volume of data transferred between the image memory 24 and the search area memory 23, because of the vast number of pixels involved in the search areas.

For this reason, normally a fifth conventional technique is used to reduce the volume of image data to be transferred, and this video encoding technique will be explained with reference to FIG. 17.

In video encoding, an image is divided in the vertical direction into so-called slices, having the same size vertically as a template to be used. A slice is further divided in the horizontal direction into the template size. Encoding is performed from the top slice to the bottom slice in an image, and within each slice, encoding is performed from a left template to a right template successively. Therefore, there is considerable duplication of search areas between two adjacent templates.

For example, search areas for the templates 27, 28 in a slice 26 shown in FIG. 17 are respective areas 29, 30, and when the detection process for a motion vector for template 27 is finished, all the pixels in the search area 29 are stored in the search area memory 23 shown in FIG. 16. Subsequent to detection of motion vectors using template 27, suppose that motion vector searches using template 28 is performed and that pixels from the newly searched area 31 are transferred to the memory, all the pixels in the search area 30 for the template 28 will be memorized in the search area memory 23. In other words, if searches are conducted successively from left to right templates, there is no need to transfer all the pixels in the respective search areas of individual templates from the image memory 24 to search area memory 23, but to transfer only those pixels in the search area that are not duplicated by the left adjoining template.

In FIG. 17, pixel positions in the vertical direction in search area 29 and search area 30 are actually coincident, but in the diagram, the search areas 29, 30 are shown shifted so as to clearly indicate the duplicated area.

The fifth technique explained above is quite compatible with the fourth technique. This is because, when all the search areas of the templates contained in a slice are shifted by the same amount, the fifth technique can be applied easily.

However, the fourth technique developed to increase the search area while keeping the cost low by utilizing historical estimation of motion vectors, can present problems when the movement of currently encoded images suddenly changes, resulting that a motion vector could not be detected in narrow search areas. If a vector is unable to be found in any narrow areas, an amount of shift to be used in the subsequent searches cannot be determined. For example, after a scene change, if the video images consist of images whose motion vectors exceed the narrow area, then, even if the images are moving in the same direction at the same speed, the initial amount of pixels to be shifted cannot be determined, resulting that no subsequent movement can be estimated.

Further, in the fourth conventional technique, the same shift is applied to the overall image so that if there is a different type of movement within the image, the technique is not applicable. For example, in an enlarged view of a pendulum, the support side of the pendulum moves slowly while images closer to the tip of the pendulum will move faster. In another example, in a video sequence showing a moving train, the background is stationary while the train moves horizontally in a given direction. In such images, if it is desired to detect motion vectors in as small a search area as possible, the search area must be shifted by different pixel amounts even within one image.

Further problem in the fourth technique is that, if it is detected that a current movement is different compared with historical movements, as a result of searches in a local region of an image, this change cannot be reflected in the remaining search areas in the same image.

SUMMARY OF THE INVENTION

It is an object of the present invention to provide a method and an apparatus to enable enlarging search areas for motion vectors without increasing the cost of the apparatus, and to ensure detection of a movement within the wide search area and determine an amount of pixel shifting required for detecting a motion vector by searching in a wide search area for movements in a video image currently being encoded, without depending on historical encoded video images.

The object has been achieved in an apparatus designed especially for a method comprising the steps of: 1) searching in a wide area and obtaining a reference vector to indicate an overall image movement; 2) searching in narrow areas centered about the reference vector for every template in a reference image that produced the reference vector, and obtaining a displacement vector in relation to the reference vector for each template; and 3) summing the reference vector and the displacement vector for each template, and assigning a computed result as a motion vector for a respective template.

Accordingly, it is possible to enlarge the search area without increasing the cost of the apparatus, and to ensure finding a motion vector if it is within the enlarged search area.

Also, by detecting a reference to indicate an overall image movement, and searching in detail about the reference vector, disparity in motion vectors caused by erroneous detection can be suppressed, thereby improving the quality of encoded images.

The object has also been achieved in another version of the apparatus especially designed for another method, comprising the steps of: 1) evaluating, in step 1, a movement of a whole template group containing a specific number of templates, and outputting a detected movement when an overall image movement of a whole template group is detected, and outputting a no-detection indicator when an overall image movement is not detected; 2) shifting, in step 2, a search center of a next template group according to the detected movement when the overall image movement is detected; and 3) assigning a specific motion vector to a center block in a search area to be searched by a next template group when the overall image movement is not detected.

Accordingly, it is possible to enlarge the search area without increasing the cost of the apparatus, and to ensure finding a motion vector if it is within the enlarged search area. It is also possible to adjust the amount of shift of search areas to reflect the search results obtained from a portion of an image.

Also, by evaluating an overall image movement produced by a whole template group and shifting the search area according to the overall image movement, disparity in motion vectors caused by erroneous detection can be suppressed, thereby improving the quality of encoded images.

DESCRIPTION OF THE PREFERRED EMBODIMENTS

The following embodiments are not meant to limit the scope of the claims. Also, it is not necessary that all the combinations of features in the various embodiments are required to achieve the objective.

In the following embodiments, two apparatuses having different features for motion vector search will be presented.

An outline of the processing steps in the first method and apparatus for determining motion vectors, is as follows.

A motion vector of an overall target image is obtained by a suitable method, and this vector is chosen as the reference vector to indicate the movement of the overall image. Examples of the method for determining the overall image movement is either to obtain motion vectors in a wide search area, using several templates in the target image, or carry out searches in a reduced image produced by sub-sampling.

Then, narrow search areas centered about the reference vector are selected for each template in the target image, and a displacement vector in a narrow search area is obtained. A motion vector for a template is obtained as a sum of the obtained displacement vector and the reference vector. This step is carried out for all the templates in the target image.

For the second method and apparatus for determining motion vectors, an outline of the processing steps is as follows.

In a target image, a template group containing more than one template is selected. If a motion vector for the template group can be determined using a motion vector for each template in the template group, the shift location of the search center for a next template group is established according to the motion vector for the previous whole template group of which a motion vector has been determined. If, on the other hand, a motion vector for the template group cannot be established, the next search area will be shifted to a different location for the next template group with respect to the shift location used for the previous template group of which a motion vector has not been established.

In the following embodiments, Embodiments 1-1 to 1-6 are based on the first method and apparatus and Embodiments 2-1 to 2-7 are based on the second method and apparatus.

The first search method and apparatus will be presented in the following.

Embodiment 1-1

Figure 1:
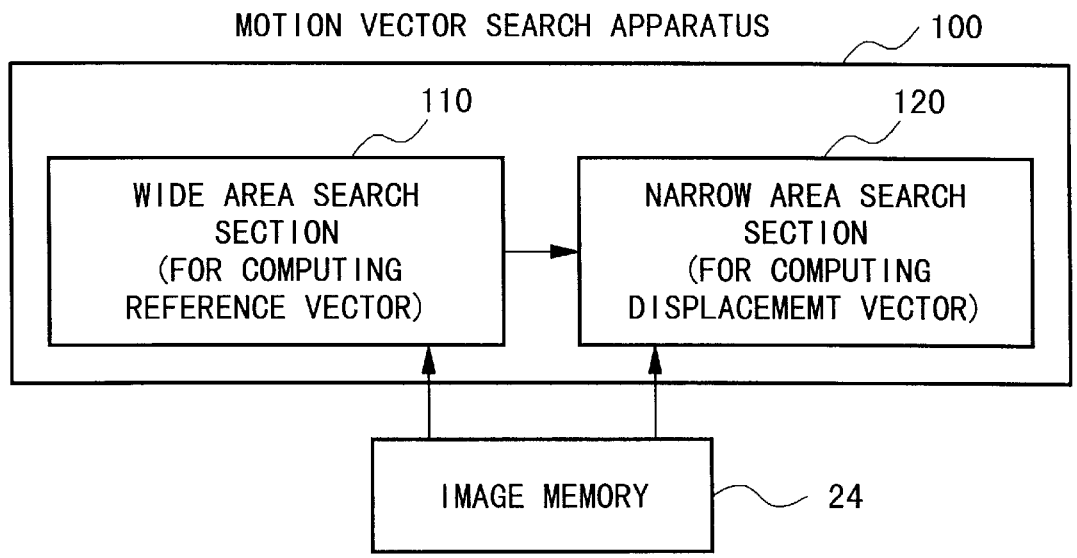
FIG. 1 is a block diagram of an example of the configuration of the motion vector search apparatus in the first to fourth variations of Embodiment 1.

FIG. 1 is a block diagram of the configuration of the apparatus in Embodiment 1-1.

The motion vector search apparatus 100 is comprised by a wide area search section 110 for determining the reference vector; and a narrow area search section 120 for determining a displacement vector.

The reference vector in the first method refers to a motion vector of a target image that indicates the movement of the overall image.

A displacement vector refers to a motion vector that each template in the target image must take to reach the location indicated by the reference vector.

Figure 2:
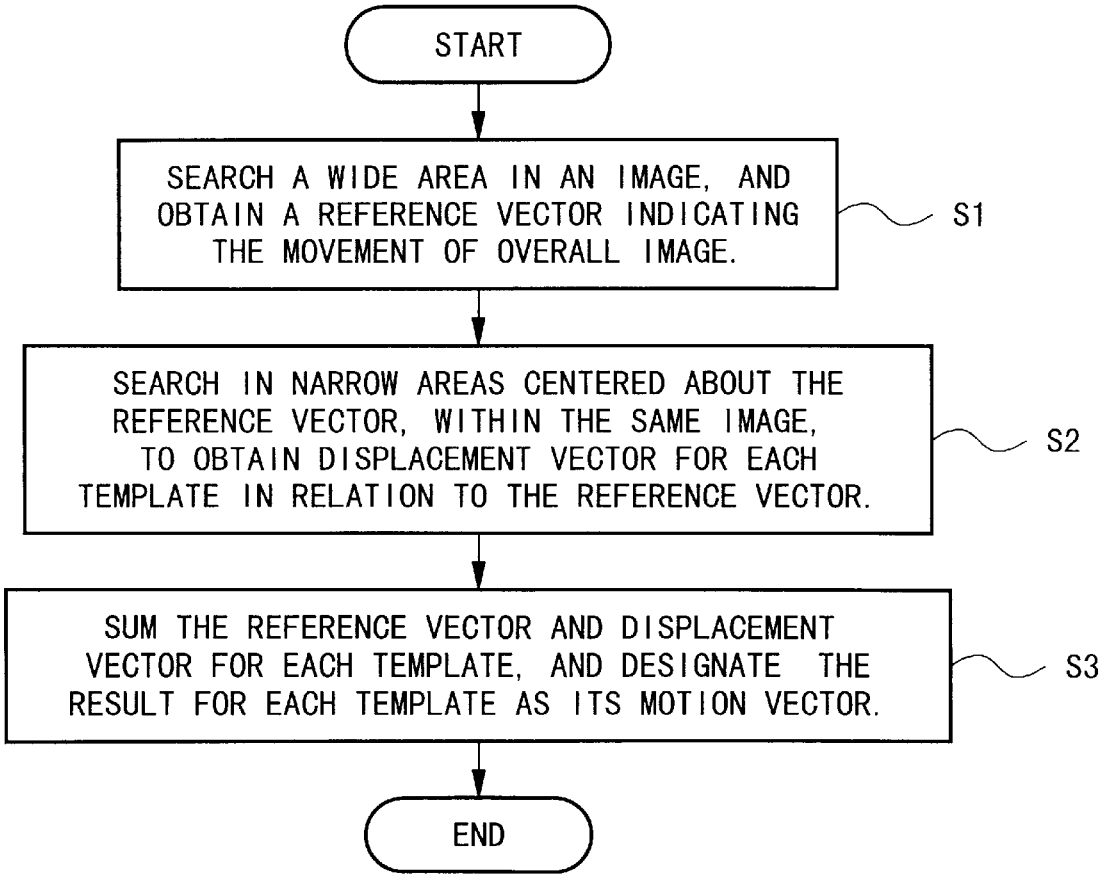
FIG. 2 is a flowchart showing the processing steps in Embodiment 1-1.

FIG. 2 is a flowchart of the processing steps in Embodiment 1-1.

The explanation given below are common to all other embodiments based on the first method.

In the present embodiment, a wide area is searched using the wide area search section 110 to determine the reference vector to indicate the movement of the overall target image (step S1).

In this instance, the wide area search section 110 obtains motion vectors of a number of templates in the target image that indicate individual movements over a wide range in the search area. And, a motion vector of the overall target image is determined in relation to a comparison image, using more than one-motion vectors thus obtained. Clearly, if the computational power of the wide area search section 110 is sufficiently high, motion vectors can be determined for all the templates in the target image. Details of the action of the wide area search section 110 will be explained in Embodiments 1-2~1-4.

Here, "a wide area" or "a wide range of search areas" means a search area which is larger than what is normally selected as a search area.

For example, the image size in one frame for digitized NTSC signals is 720 pixels×480 lines. The size of templates in the image (generally referred to as macroblock) is 16 pixels×16 lines. The search area is generally specified within an area described by ±32 pixels horizontal and ±32 pixels vertical that a macroblock can be shifted. In contrast, "a wide area" or "a wide range of search areas" in the present invention refers to an area described by ±100 pixels horizontal and ±50 pixels vertical.

For example, the image size in one frame of 1080I format of HDTV (High Definition TV) is 1920 pixels×1080 lines. The size of macroblock in the image is also 16 pixels×16 lines. In this case, "a wide area" or "a wide range of search areas" in the present invention refers to an area described by ±200 pixels horizontal and ±100 pixels vertical.

Accordingly, selecting a larger value for the search area than one specified in normal conventional methods means that the present method is applicable to images containing fast moving objects, that is, large motion vectors for templates. It also means that a most suitable motion vector can be chosen as the reference vector.

Next, in the narrow area search section 120, searches are made in narrow areas of all the templates in the target image centered about the reference vector, and a displacement vector in relation to the reference vector is obtained for each template (step S2), and a motion vector for each template is obtained by summing the reference vector and a respective displacement vector (step S3).

Figure 11:
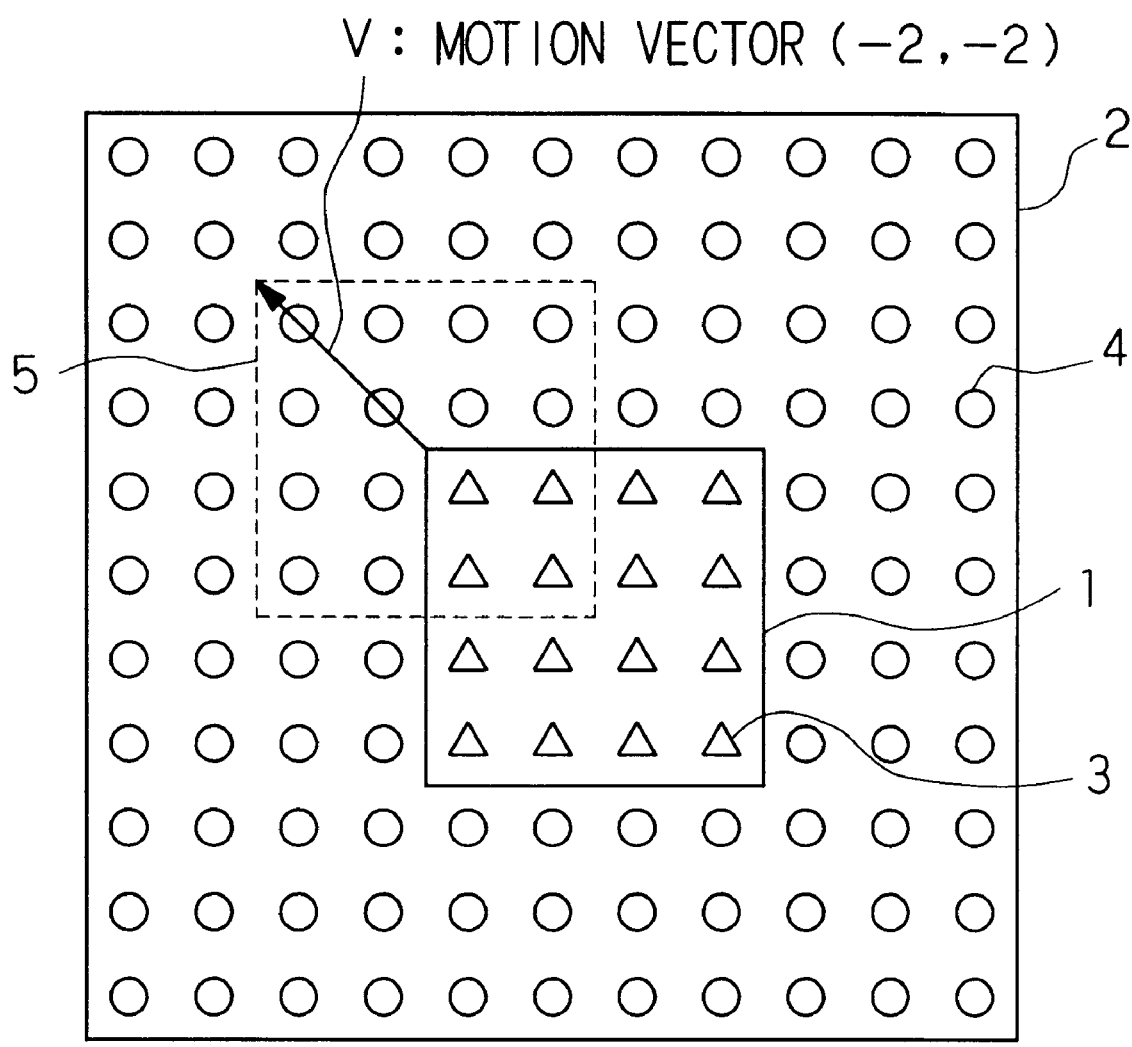
FIG. 11 is a schematic illustration of a conventional motion vector search technique.
Figure 12:
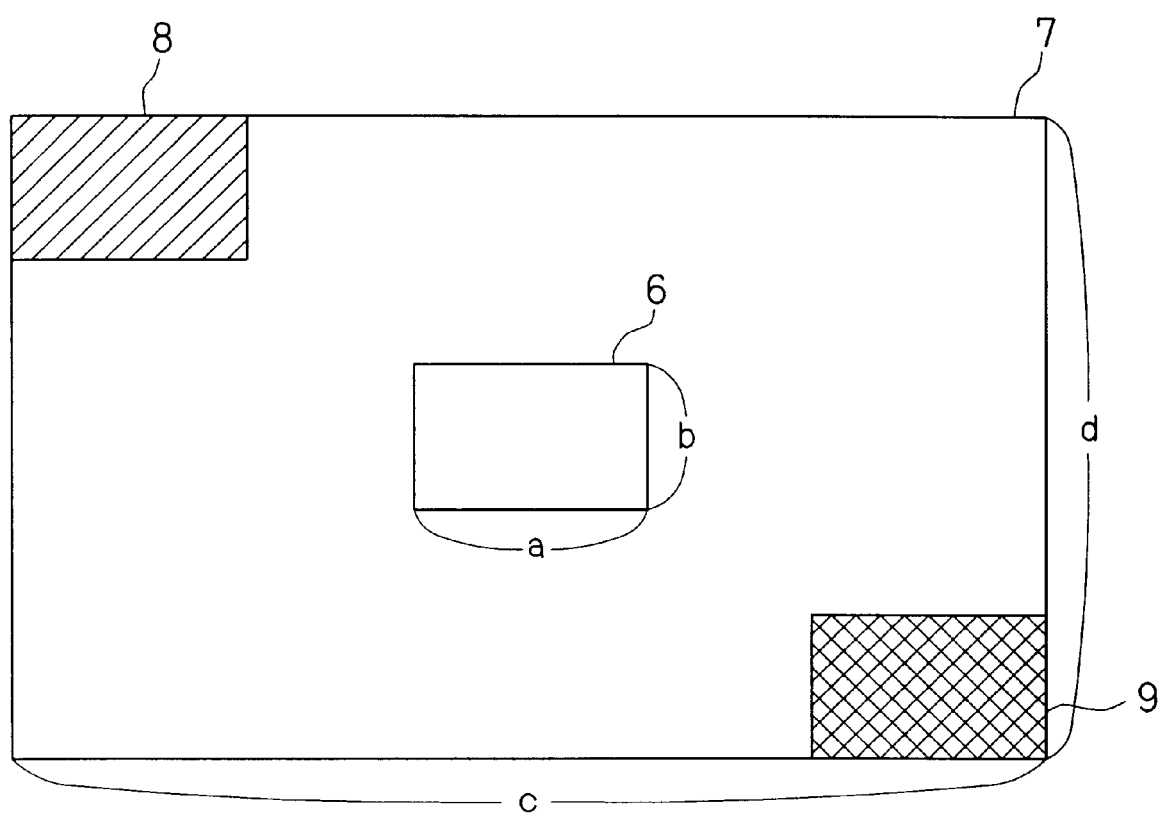
FIG. 12 is a schematic illustration of a conventional motion vector search technique.
Figure 13:
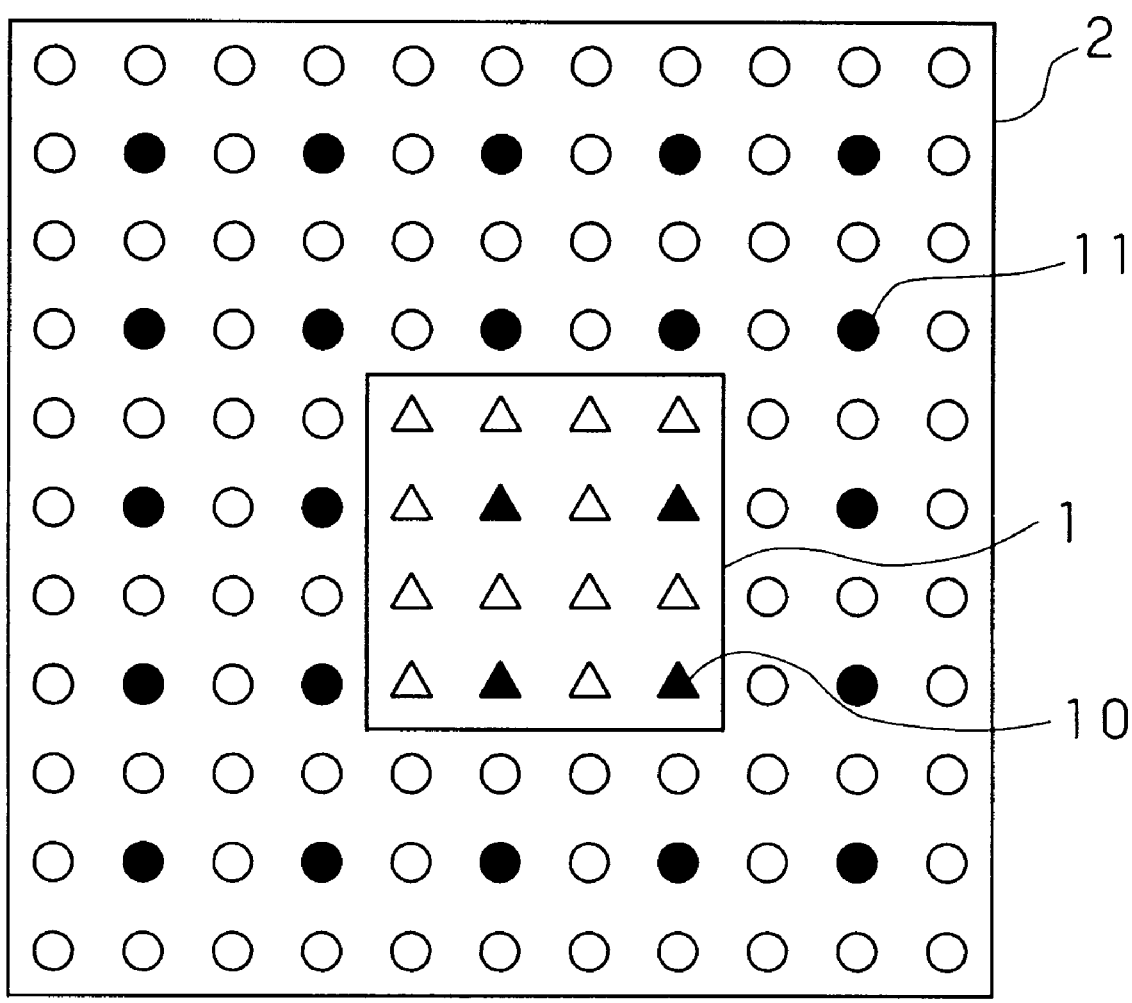
FIG. 13 is a schematic illustration of a conventional motion vector search technique.
Figure 15:
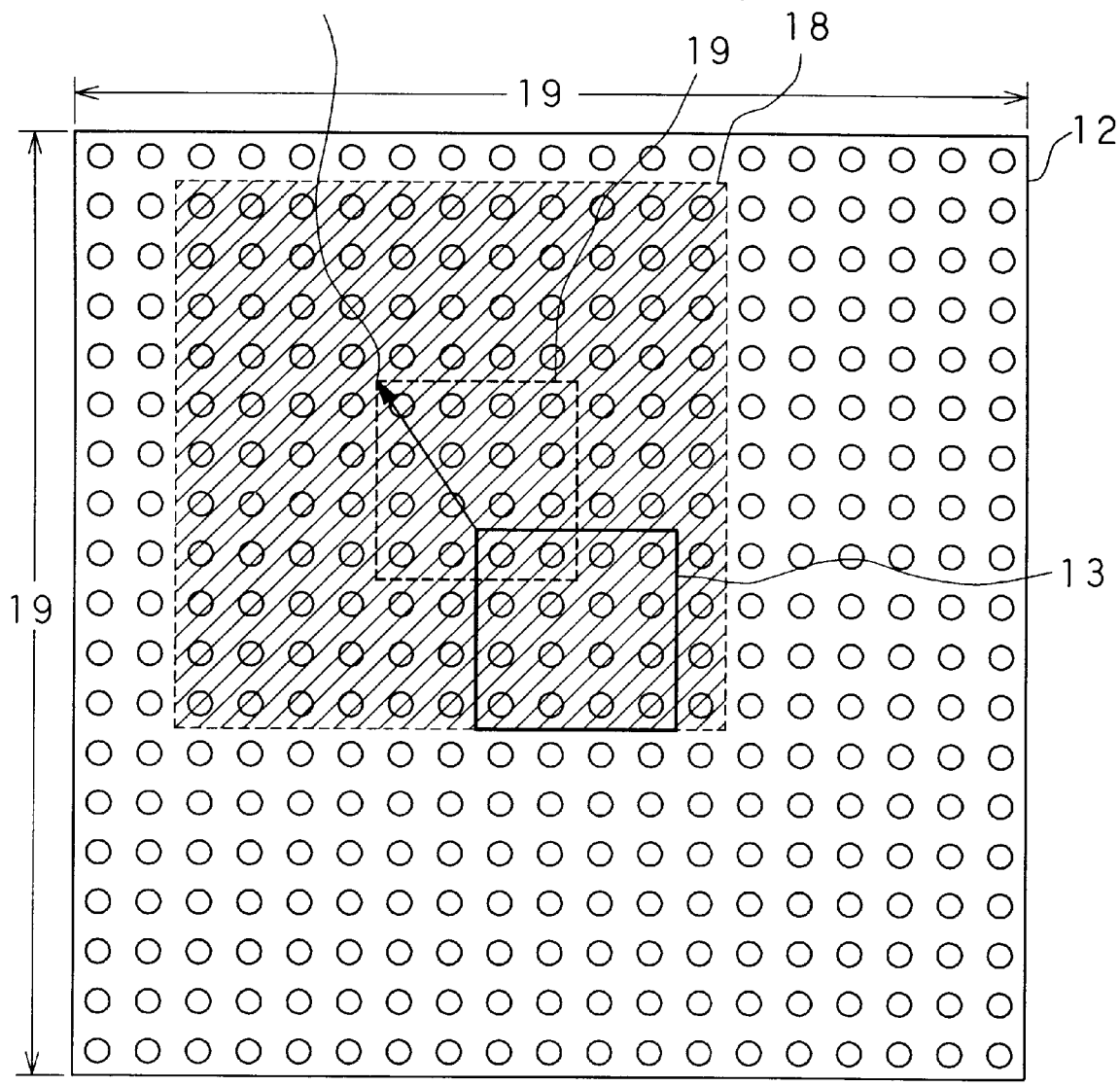
FIG. 15 is a schematic illustration of a conventional motion vector search technique.

In more detail, the narrow area search section 120 selects a template A to search for a motion vector in a narrow area described by shifting the reference vector, as explained earlier using FIG. 15. The narrow area search section 120 obtains a motion vector (in this case, a displacement vector) using the exhaustive search method explained earlier with reference to FIGS. 11 and 12. The narrow area search section 120 carries out searches using each template in the target image to determine a respective displacement vector, thus completing step S2.

Subsequently, the narrow area search section 120 sums a displacement vector and the reference vector for each template to obtain its motion vector in the target image, thereby completing step S3.

It should be noted that there may be more than two reference vectors indicating the movement of overall scenes of the target image. An example would be a large moving object in a stationary background scene.

Embodiment 1-2

Figure 3:
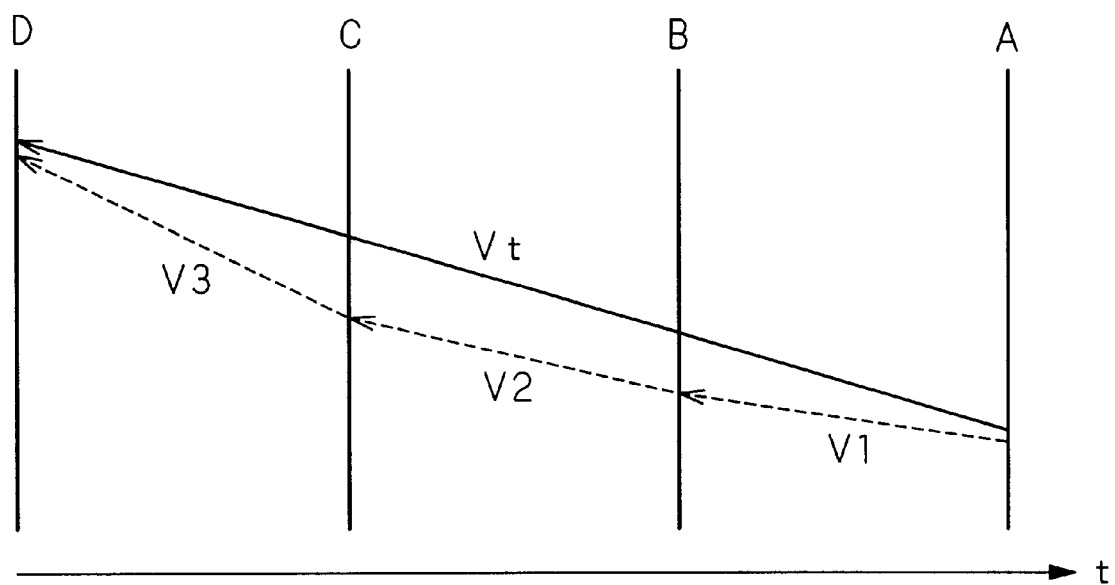
FIG. 3 is an illustration of the motion vectors in Embodiment 1-2.

FIG. 3 shows an illustration for the motion vector in Embodiment 2-1.

Moving images are formed by several contiguous image frames, and in video encoding, it is sometimes necessary to obtain a motion vector of an image several frames back.

FIG. 3 shows four contiguous images A, B, C and D. A motion vector Vt indicates the movement of image D based on the reference image, which is image A in this case. Normally, images are two-dimensional, but in this case, explanation is given in terms of one-dimensional image, for simplicity. A vector V1 is a vector to show the movement of image B based on image A. Similarly, vectors V2, V3 indicate the movement of image C based on image B, and the movement of image D based on image C, and are related by an equation Vt=V1+V2+V3.

Figure 4:
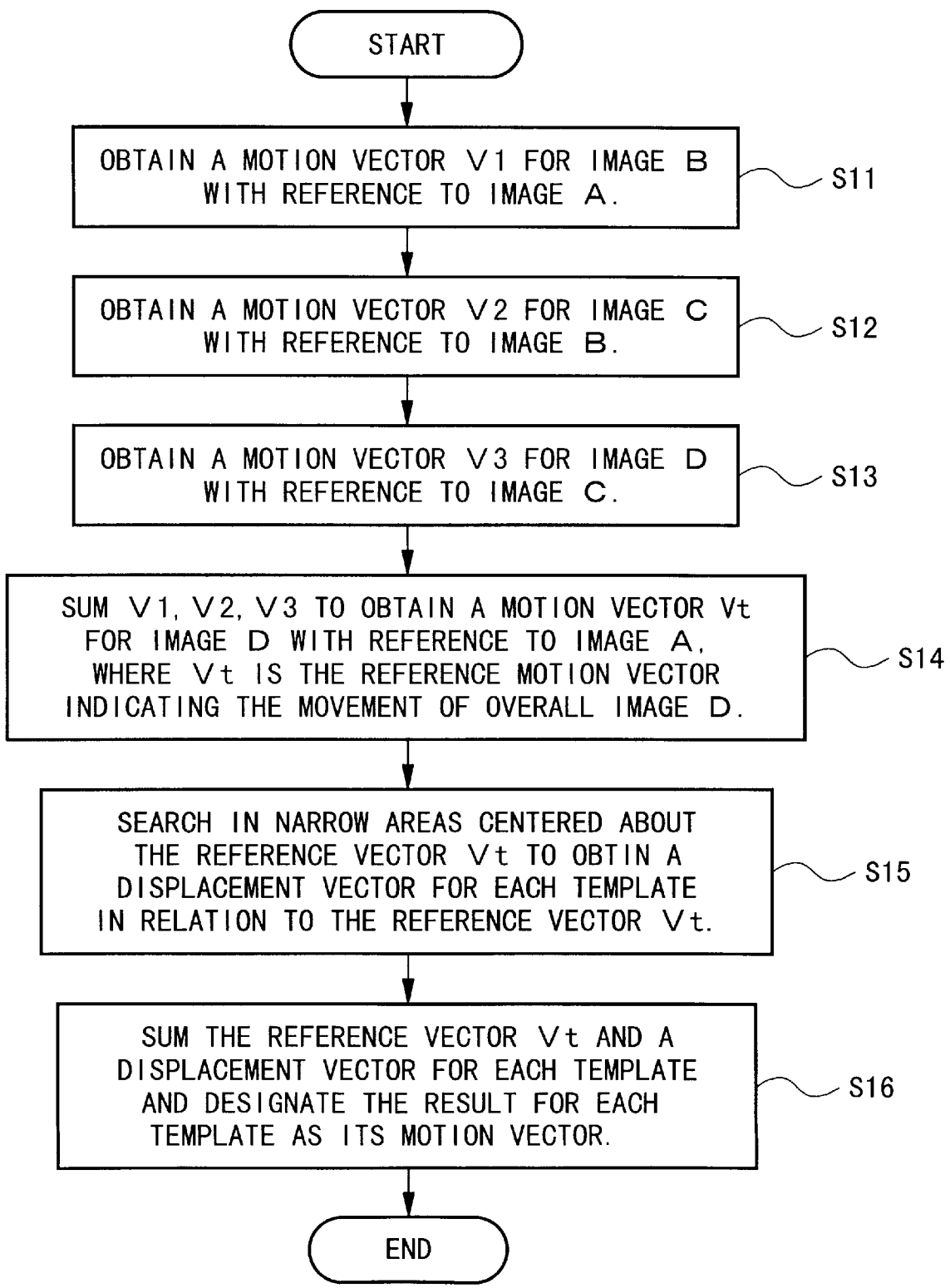
FIG. 4 is a flowchart showing the processing steps in Embodiment 1-2.

FIG. 4 shows a flowchart for the processing steps in Embodiment 1-2 using the same apparatus as in Embodiment 1-1.

The wide area search section 110 carries out separate searches to obtain V1, V2, V3 (steps S11~S13) and sums V1, V2, V3 to obtain the reference vector Vt of image D based on image A (step S14).

A method of obtaining a motion vector between neighboring images (frames) A, B using the wide area search section 110 will be explained.

The wide area search section 110 performs the following steps.

1) Selects a plurality of templates in specific areas of the image A, for example, central area or corners in image A;
2) Specifies a search area for each selected template, and obtains a motion vector for each template for image B, for all the selected templates. Any of the conventional methods such as the first to fourth technique can be used to obtain motion vectors;
3) Examines all sums of the absolute values of differences or sums of squares of the differences of the computed motion vectors, and if there is a value that is larger than a pre-determined threshold value, then it decides that the movement of image B based on image A cannot be determined, so that the motion vector is regarded to be the zero motion vector (0, 0);
4) Examines all sums of the absolute values of differences or sums of squares of the differences of the computed motion vectors, and if all the values are smaller than or equal to the pre-determined threshold value, then it decides that an average value or a center value of the computed motion vectors is the motion vector of image B based on image A.

The wide area search section 110 performs these steps in steps S11, S12, S13.

Steps S11~S14 in FIG. 4 indicate the actual processing steps involved in step S1 shown in FIG. 2.

The narrow area search section 120 searches in narrow areas, centered about the reference vector, for each templates in image D based on image A, and a displacement vector for each template is obtained in relation to the reference vector for all the templates (step S15). Then, a motion vector is obtained for each template by summing the reference vector and a respective displacement vector (step S16).

Steps S15, S16 perform the same processing as steps S2, S3 shown in FIG. 2.

When determining a motion vector for an object moving at a constant speed, searches in images separated by a long time interval require wider areas to be searched compared with images separated by a short time interval. In this embodiment, repeated searches are made in small areas in images separated by a short time interval, and a summed value of the motion vectors is selected as the motion vector between the two images. Therefore, the present search process is more efficient compared with a case of searching in images separated by a large time interval.

In this embodiment, there are two image B, C inserted between an image A to be processed and an image D to be compared against, but same processing steps are applicable even if there are more images therebetween.

Embodiment 1-3

Figure 5:
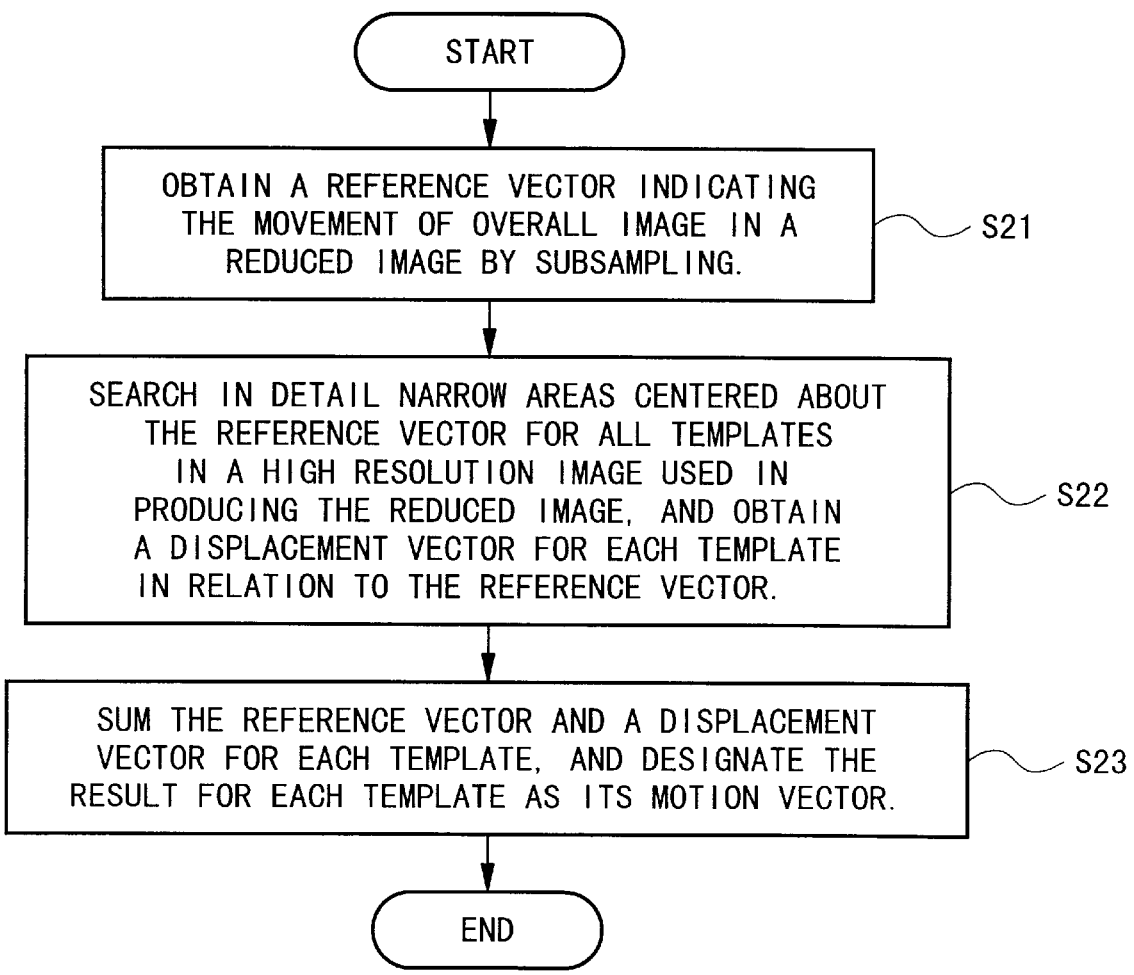
FIG. 5 is a flowchart showing the processing steps in Embodiment 1-3.

FIG. 5 shows a flowchart for the processing steps in Embodiment 1-3 using the same apparatus as in Embodiment 1-1 shown in FIG. 1.

In this embodiment, the reference vector is obtained in a reduced image produced by sub-sampling a high resolution image directly using the wide area search section 110, or by sub-sampling a reduced image produced by converting the high resolution image through a low-pass filter (step S21).

Details of step S21 are as follows.

1) Prepare a reduced image A of a target image and a reduced image B of an image to be compared with; (Methods of producing reduced images are as described earlier)
2) Specify a wide search area b in the reduced image B for a template-a in the reduced image A;
3) Obtain a motion vector for template-a in the wide search area b;
4) Obtain a motion vector for all the templates in the reduced image A by repeating the steps 2) and 3);
5) Determine an average value or a center value of all the motion vectors obtained and assign this value as the reference vector of the overall target image.

Here, step S21 relates to specific processing steps in step S1 shown in FIG. 2.

After completing step S21, the narrow area search section 120 searches narrow areas centered about the reference vector in detail using each template, in the high resolution image (used in preparing the low resolution image), thus obtaining a displacement vector for each template (step S22). A sum of the displacement vector and the reference vector is obtained for each template, and the resulting values are used as the motion vector of the respective template (step S23).

Steps S22, S23 carry out same processing as steps S2, S3 shown in FIG. 2.

In this embodiment, the reference vector is obtained using the wide area search section 110 on a reduced image, therefore, the cost of searching in a wide area can be suppressed.

In the previous Embodiment 1-2, the wide area search section 110 can apply step S21 in steps S11, S12, S13 to obtain motion vectors V1, V2, V3 shown in FIG. 4.

Embodiment 1-4

Figure 6:
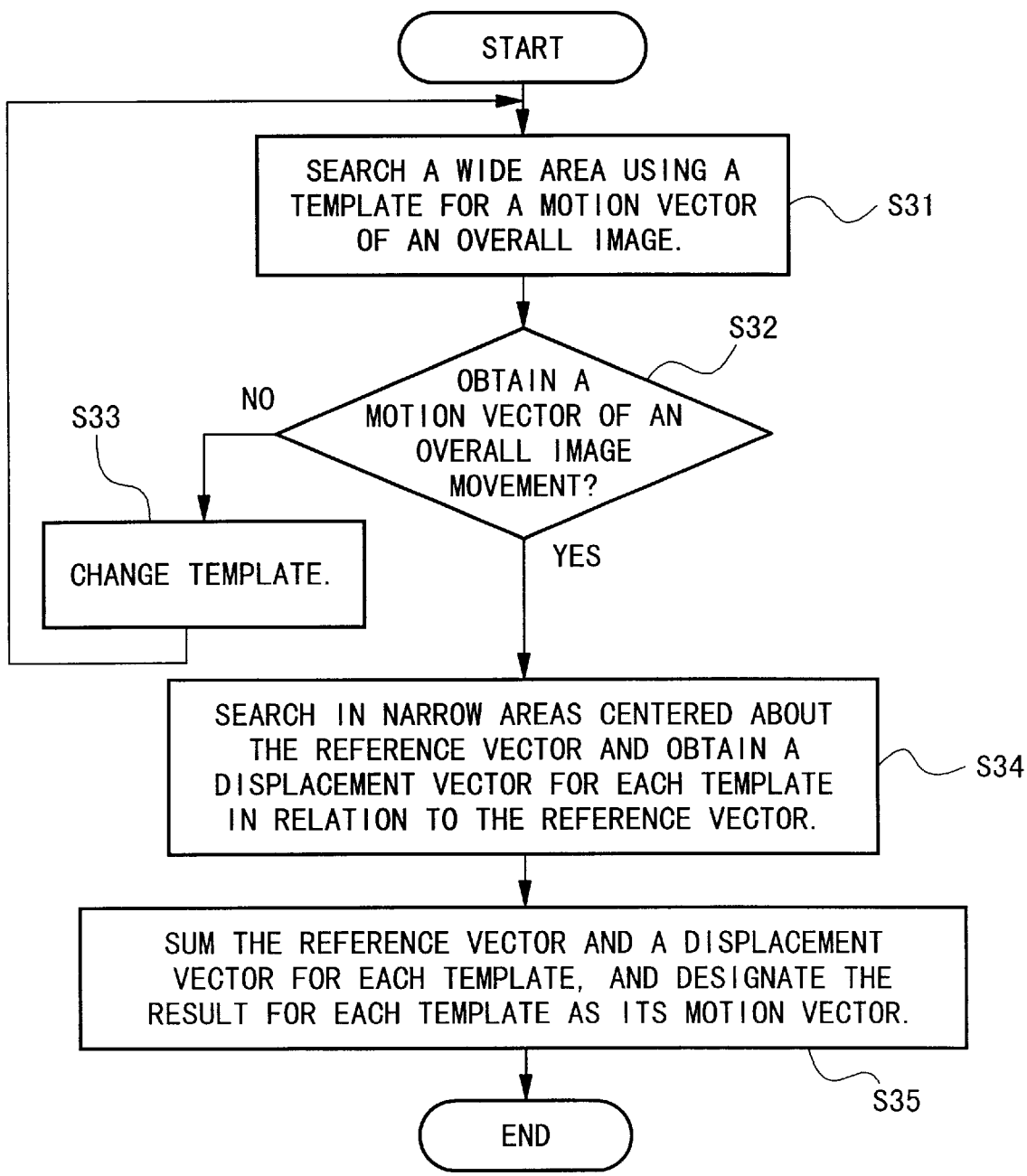
FIG. 6 is a flowchart showing the processing steps in Embodiment 1-4.

FIG. 6 shows a flowchart for the processing steps in Embodiment 1-4 using the same apparatus as in Embodiment 1-1 shown in FIG. 1.

In this embodiment, the wide area search section 110 carries out searches using a lesser number of templates than the total number of templates needed to determine the movement of the overall target image, and obtains the reference vector indicating the movement of the overall target image (step S31~S33).

Specific actions of the wide area search section 110 in steps S31~S33 are as follows.

First, it is assumed that a certain number of templates required for determining the movement of the target image has been selected at the processing start point. The process of selecting the number and location of the templates in steps S31~S33 will be explained later. Also, it is assumed that the first template to be processed has been chosen from a plurality of selected templates at the processing start point.

First, the wide area search section 110 specifies a wide search area for the selected template in the comparison image, and obtains a motion vector for this template. Here, any one of the first to fourth conventional methods can be used for obtaining a motion vector (step S31).

Next, the section 110 determines whether the reference vector can be obtained by checking whether or not all the processing steps have been completed for all the selected templates (step S32). If there are unprocessed templates remaining, a next template to be processed is selected from the unprocessed templates (step S33).

In the meantime, if the motion vectors have been determined for all the templates, it is possible to determine the reference vector based on the respective motion vectors for the selected templates (step S32). The reference vector is calculated as follows.

All sums of the absolute values of differences or sums of squares of the differences of the computed motion vectors are examined to find out whether there is a value that is larger than a pre-determined threshold value, if there is, then it is decided that the movement cannot be detected, so that the reference vector is a zero motion vector (0, 0);

All sums of the absolute values of differences or sums of squares of the differences of the computed motion vectors are checked to find out whether all the values are smaller than or equal to the pre-determined threshold value, if they are, then it is decided that the reference vector is an average value or a center value of the computed motion vectors.

In the above process, steps S31~S33 relate to specific processing steps in step S1 shown in FIG. 2.

When it is judged that the reference vector has been determined in step S32, the narrow area search section 120 searches the narrow areas centered about the reference vector for all the templates used to determine respective displacement vectors, and obtains a sum of the reference vector and the displacement vector for each template, the result becomes the motion vector for each template (step S35).

Steps S34, 35 carry out same processing as steps S2, S3 shown in FIG. 2.

In this embodiment, the wide area search section 110 uses only a small number of templates relative to the total number of templates in one image, thereby suppressing the cost for searching the wide area.

The number of templates required to determine the movement of the overall image is pre-selected depending on the image type. For example, when the overall scene is moving in a given direction, only one template is needed to determine the movement of the overall image. If the movements are unclear, and if it is required to know if there is a movement direction, a total of five areas, a center area plus four corners of the image is needed to be examined. The number of templates required to determine the movement of the overall image can be determined statistically so that the final results contain minimum errors.

In the previous Embodiment 1-2, the wide area search section 110 can obtain motion vectors V1, V2, V3 by applying steps S31~S33 to steps S11, S12, S13.

Embodiment 1-5

Figure 7:
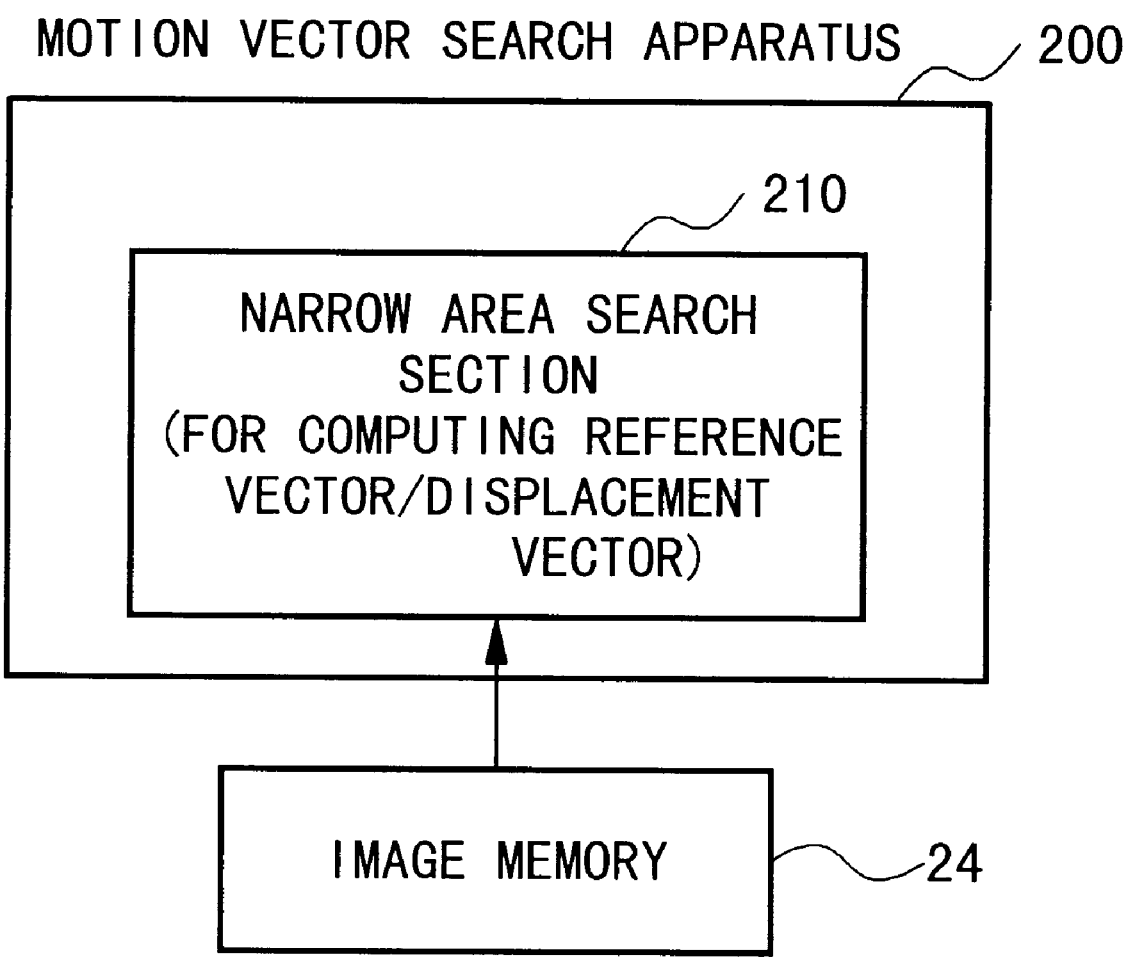
FIG. 7 is a block diagram of an example of the configuration of the motion vector search apparatus in Embodiment 1-5 and Embodiment 1-6.

FIG. 7 shows a block diagram of the configuration of the apparatus in Embodiment 1-5.

The motion vector search apparatus 200 is comprised only by a narrow area search section 210. In this embodiment, the reference vector and displacement vectors are obtained by time-sharing the use of the narrow area search section 210.

Figure 8:
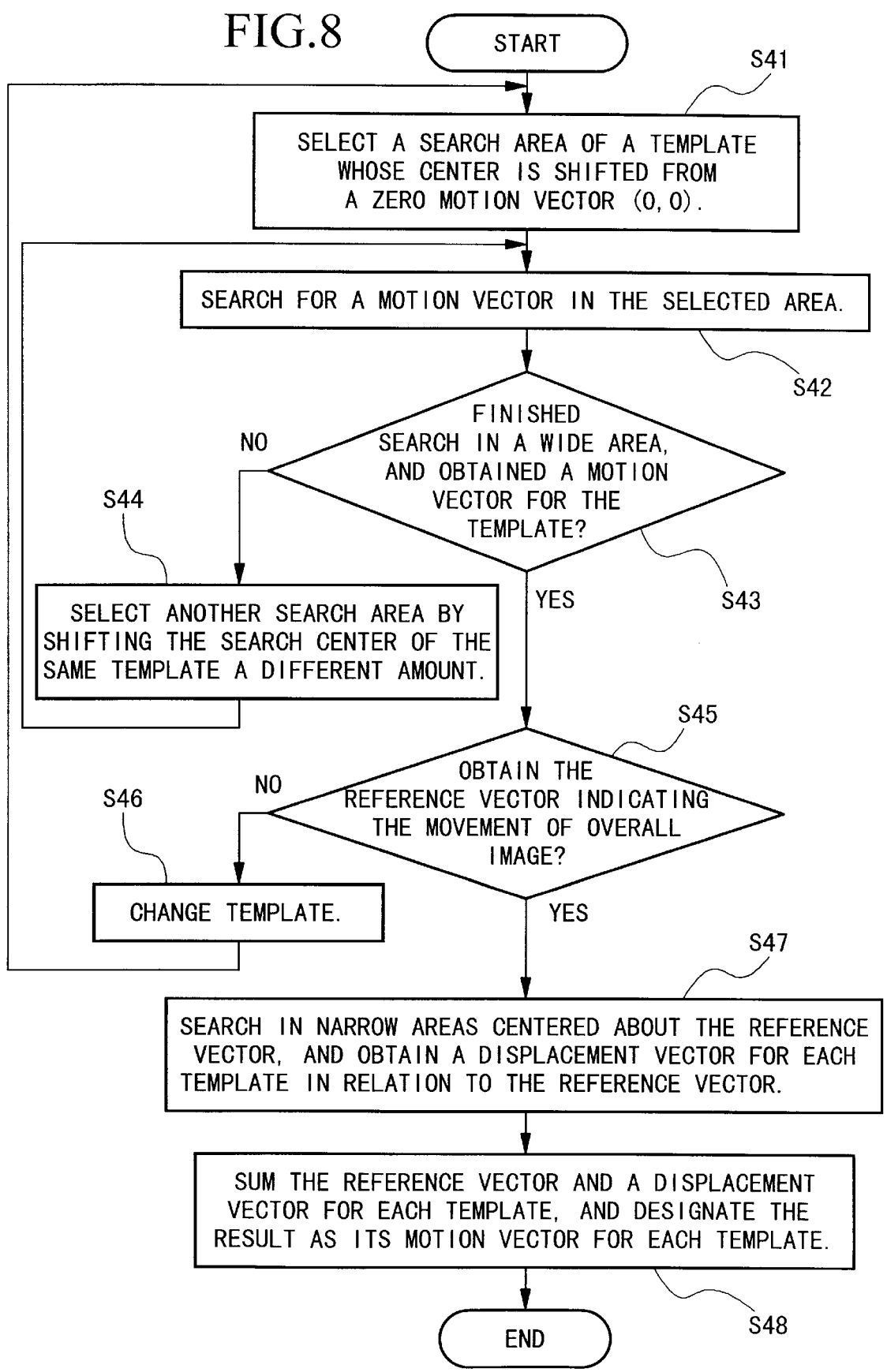
FIG. 8 is a flowchart showing the processing steps in Embodiment 1-5.

FIG. 8 shows a flowchart of the processing steps in Embodiment 1-5.

Figure 14:
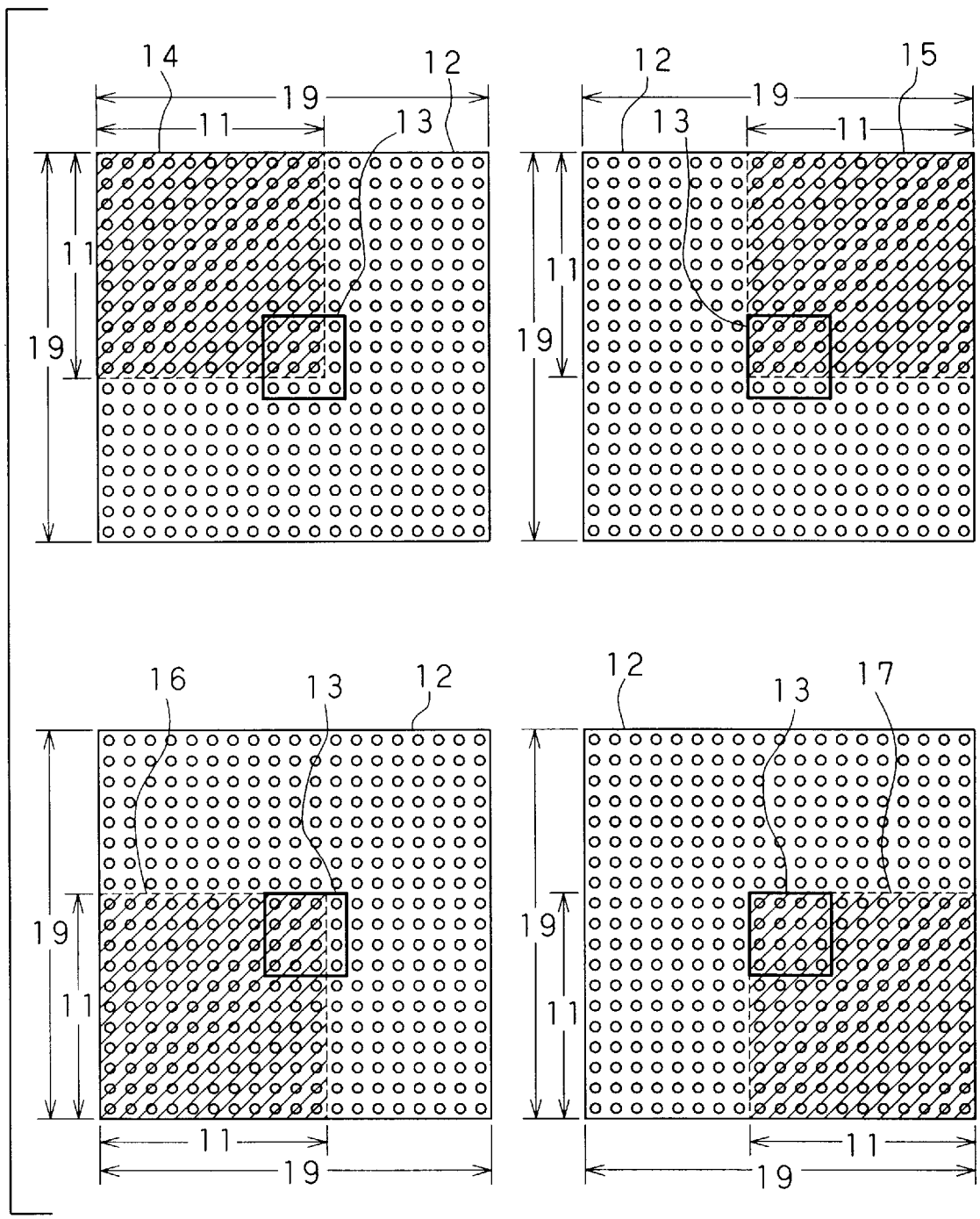
FIG. 14 is a schematic illustration of a conventional motion vector search technique.

For one template, a plurality of narrow areas are successively searched until the overall wide area has been searched to obtain a motion vector in a wide area. Specifically, four narrow areas 14, 15, 16, 17 shown in FIG. 14 are sequentially searched to obtain a motion vector in the wide area 12.

Specifically, the following steps are executed. A search area is selected by shifting the center of search area of the chosen template from the location of the zero motion vector (0, 0) to a given location (step S41). A motion vector in the selected area is searched (step S42). Until the search of the overall wide area is completed and a motion vector for the chosen template is determined (step S43), the same chosen template is used repeatedly by varying the amount of shift of the search area center (step S44).

The above processing steps are repeated until the reference vector indicating the movement of the overall image is obtained (step S45) by changing the chosen template for all the number of templates (step S46) required to know the movement of the overall image.

Specifics of the search process by the narrow area search section 210 will be explained with reference to FIG. 14.

It is assumed that a certain number of templates required for determining the movement of the overall target image has been selected at the processing start point. The number of templates required for determining the movement of the overall image and their locations to be processed in steps S41~S46 are same as those explained in Embodiment 1-4. Also, it is assumed that the first template to be processed has been selected as template 13 in FIG. 14 at the processing start point.

Initially, the narrow area search section 210 selects a search area 14 to be search by template 13 (step S41).

Next, a motion vector in the search area 14 is obtained by comparing template 13 with the search area 14 (step S42).

Next, it is checked whether or not searches of the search areas 14, 15, 16, 17 are finished, i.e., searches in a wide range of search areas 12 are finished and the motion vector for the template currently being processed has been obtained (step S43).

If it is not finished, the next search area (search area 15, for example) is selected (step S44), and the process proceeds to step S42.

When searches of all the search areas 14, 15, 16, 17 are finished (yes in step S43), a motion vector for the template 13 for the wide search area 12 is obtained. At this point, it is checked to find out whether searches using all the templates are finished and whether the reference vector can be obtained (step S45). If the results of step S45 shows that searches by all the selected templates are not finished, an unprocessed template is selected from the preselected templates (step S46), and the process returns to step S41.

Here, the calculation method, for obtaining the reference vector when searches are completed by all the pre-chosen templates, is the same as the method explained in step S32 shown in FIG. 6.

The reference vector has thus been obtained.

When the reference vector to indicate the movement of the overall image is obtained, narrow areas centered about the reference vector are searched in detail using all the templates, contained in the template group in the image, to obtain a displacement vector in relation to a reference vector for each template (step S47). When a displacement vector is determined for each template, the reference vector and the displacement vector are summed, the result is assigned as a motion vector for respective templates (step S48).

Steps S47, S48 perform same processing as steps S2, S3 shown in FIG. 2.

Although differences exist in the processing section, steps S41~S46 show details of processing in step S1 shown in FIG. 2. The motion vector search apparatus 100 may obtain V1, V2, V3 by applying the steps S41~S46 to steps S11, S12, S13 shown in FIG. 4.

In this embodiment, a time interval required for searches represents a sum of the time intervals required to obtain a displacement vector and the reference vector, and search durations are longer than those in Embodiment 1-1~1-4. However, if the number of templates required to determine the reference vector is small, the time intervals, for steps S41~S46 in the flowchart shown in FIG. 8, required to determine the reference vector are shorter compared with the time intervals required to obtain displacement vectors in step S47, and the reference vector can be obtained with only a small increase in search time duration.

As the search area is widened, however, when searching for motion vectors, there is a possibility of insufficient pixel transferring capacity for the search area memory and the image memory 24, even if it is configured in such a way that the search area memory stored in the external image memory 24 is read into the search area memory (not shown) in the motion vector search apparatus 200.

Figure 9:
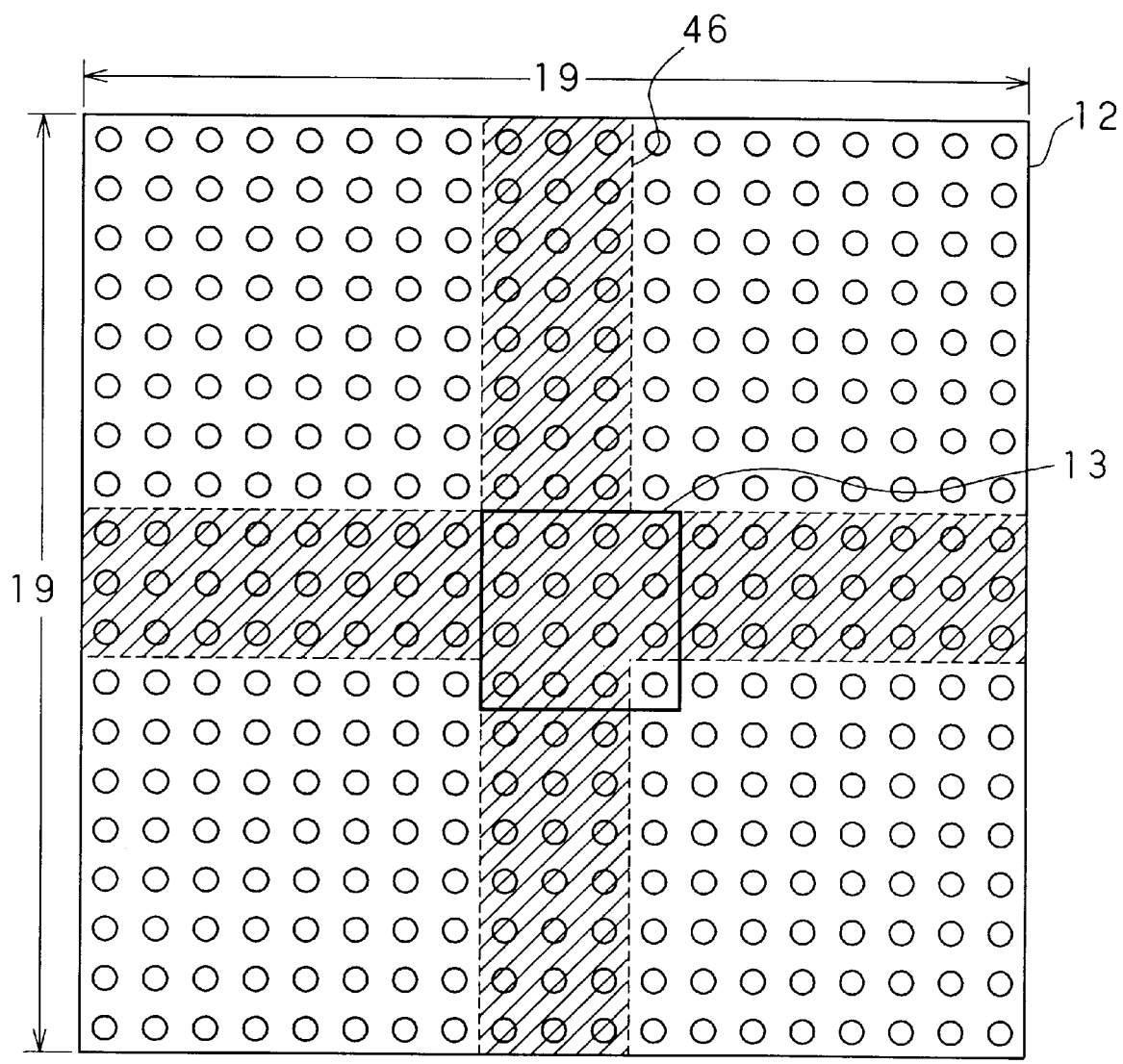
FIG. 9 is a schematic illustration of the search method in Embodiment 1-5.

FIG. 9 shows a schematic illustration of Embodiment 1-5, and the reference numeral 46 refers to the overlapped areas of the four narrow areas 14, 15, 16, 17. As can be seen in FIG. 9, few pixels belong to more than two search areas of the four narrow areas 14, 15, 16, 17. Therefore, in the configuration of Embodiment 1-5, even if the apparatus is configured such that the search areas stored in an external memory 24 is to be read into the search area memory 23 in the apparatus 200 when searching for a motion vector, the number of pixels to be transferred from the image memory 24 to the search area memory 23, when the search area is being changed, decreases only slightly. As the search area is widened, the proportion of pixels in the overlapped areas to the total number of pixels in the total search area will decrease so that the lack of sufficient pixel transfer capacity between the search area memory and image memory 24 will produce a more severe effect.

Embodiment 1-6

Figure 10:
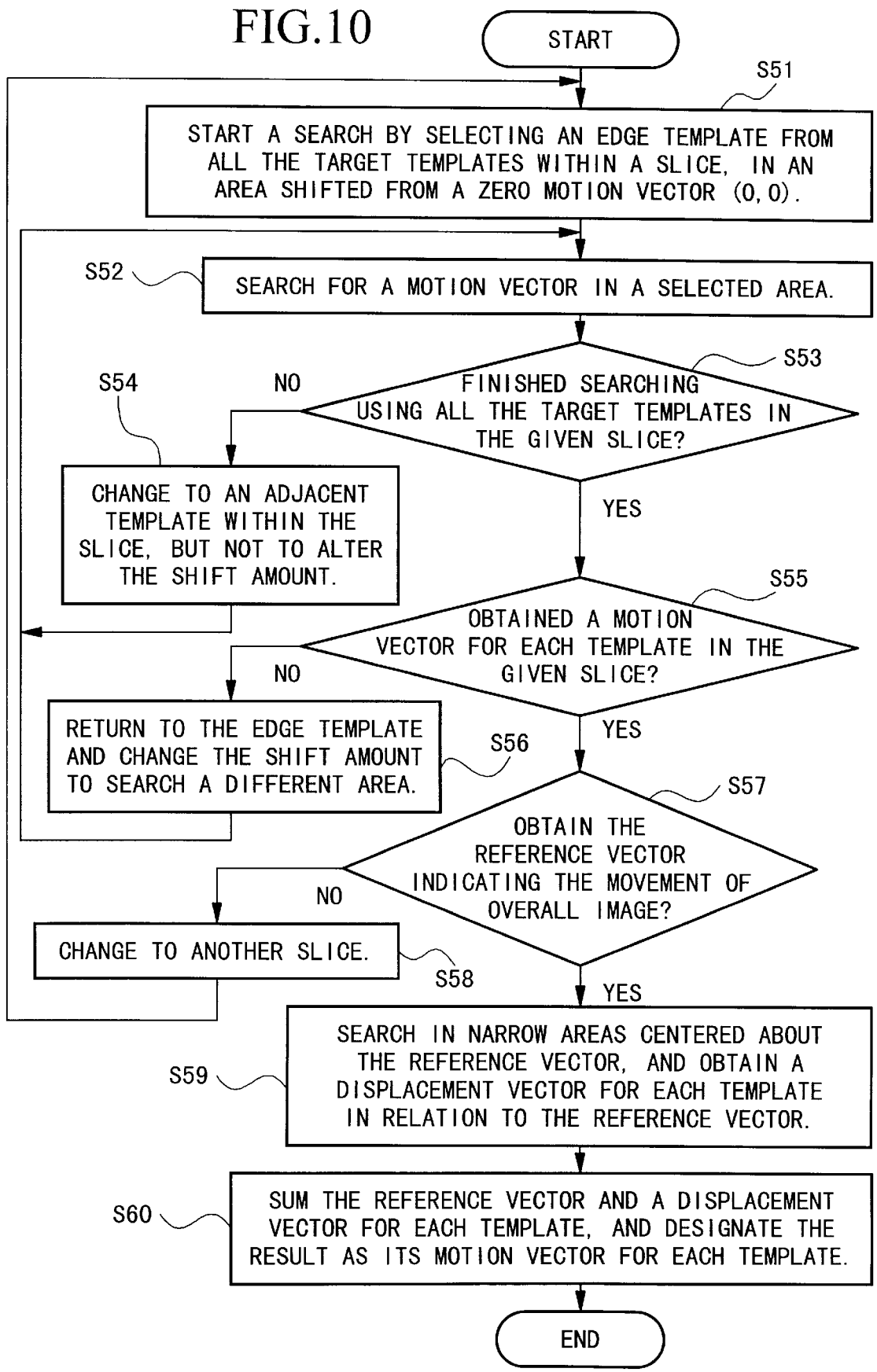
FIG. 10 is a flowchart showing the processing steps in Embodiment 1-6.

FIG. 10 shows a flowchart of the processing steps in Embodiment 1-6 using the same apparatus as in Embodiment 1-5 shown in FIG. 7.

In this embodiment, the fifth conventional technique is used to determine the reference vector, to reduce the volume of pixels transferred between the search area memory 23 and the image memory 24. That is, search areas are described by shifting a given number of pixels from the zero motion vector (0, 0), for all the target templates in a specific slice of a target image, and a search is made starting from the template located at the edge of the image. Next, after finishing searches using the target templates in the specific slice, the center of search is shifted by the given number of pixels from the zero motion vector (0, 0) to select another search area, and searches are conducted in the same manner. This process is repeated in a wide area, and motion vectors in the wide area are obtained using the target templates in another slice. The process is repeated for other slices, and the slices required to determine the movement of the overall image are searched, thereby obtaining the reference vector to indicate the overall image movement.

Further details of the process will be explained with reference to FIG. 10. First, select an edge template from the target templates within a slice, and define the search area by shifting the search center from the zero motion vector (0, 0) (step S51), and search for the motion vector (step S52) in the described search area until respective motion vectors are obtained for all the target templates (step S54). This process is repeated by searching in the adjacent slice for all the target templates in the target slice (step S53). However, in step S54, the amount of shift of the search center is not adjusted.

When motion vectors are determined for respective target templates in a target slice, same process is repeated by changing to an edge template within the target slice (step S56) until the wide search is finished within the target slice and a motion vector is determined for each target template (step S55), by returning to step S52. In step S56, the amount of shift of the search center is adjusted.

The above processing is repeated (step S58) until the required number of templates, to determine the movement of the overall image, have been searched and the reference vector to indicate the movement of the overall image is obtained (step S57).

Figure 17:
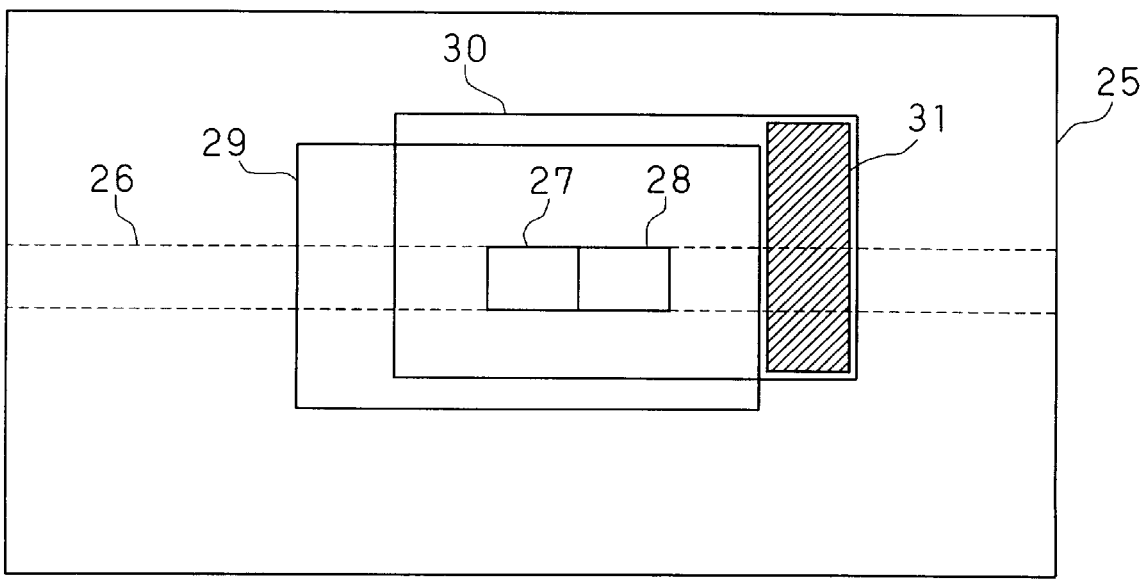
FIG. 17 is a schematic illustration of the conventional techniques.

Specific actions of the narrow area search section 210 will be explained further with reference to FIG. 17.

It is assumed that more than one slice for determining the reference vector in the target image are selected at the processing start point. An example would be three slices, one near the top area, near the center area and near the lower area of the target image, which are chosen as the processing target slices. It is also assumed that the first slice to be processed is slice 26 in FIG. 17. In steps S51~S56, motion vectors are obtained for all the target templates contained in a slice, but to simplify the explanation, it is further assumed that there are two templates contained in a slice (slice 26 contains only templates 27, 28).

The narrow area search section 210 selects a shifted search area in relation to the edge template 27 (for example, an area corresponding to search area 14 in FIG. 14) from the target templates contained in slice 26 (in this case, templates 27, 28) (step S51).

Next, by comparing the selected search area and template 27, a motion vector is obtained (step S52).

Next, it checks whether searches in areas specified by the same shift amount are finished for all the target templates 27, 28 in the slice 26 being processed (step S53).

If the search is not finished, next template 28 is used, and a search area is described by the same shift amount (for example, a search area 14 in FIG. 14) (step S54) and the process returns to step S52.

When searches are finished for the same shift area by the two target templates (yes, in step S53), it checks whether the searches in all areas (for example, four areas 14, 15, 16, 17 in FIG. 14) are finished (step S56).

When all the searches are not completed, a search area specified by a different shift amount is selected for the edge template 27 from all the templates in slice 26 (for example, a search area 15 in FIG. 14) (step S56), and the process returns to step S52.

When all the searches by the target templates are finished in all the search areas in the slice (step S55), motion vectors are obtained for the respective target templates in the wide search area (area 12 in FIG. 14).

Next, it checks whether all the slices selected for determining the reference vector are processed so as to obtain the reference vector (step S57).

When there are unfinished slices (step S57), another unprocessed slice is selected (step S58), and the process returns to step S52.

Here, the method for calculating the reference vector in step S57, when all the target slices are processed, is the same as the method explained in step S32 in FIG. 6.

The reference vector has thus been determined.

When the reference vector to indicate the movement of the overall image is obtained, narrow areas centered about the reference vector are searched in detail using all the templates, contained in the template group in the image, for obtaining the reference vector, and displacement vectors are obtained for each template (step S59). When a displacement vector is determined for each template, the reference vector and the displacement vectors are summed, and the results are assigned as the motion vectors for respective templates (step S60).

Steps S59, S60 perform same processing steps as steps S2, S3 shown in FIG. 2.

Although differences exist in the processing sections, steps S51~S58 represent the specific steps in step Si shown in FIG. 2. Also, in Embodiment 1-2, motion vector search apparatus 100 can obtain V1, V2, V3 by applying steps S51~58 to processing steps S11, S12, S13 shown in FIG. 4.

Also, in this embodiment, motion vectors were determined for all the templates contained in slices selected for obtaining the reference vector, but it is not necessary to limit to this procedure. For example, contiguous templates, which are a part of templates in the target slice, may be processed. In this case also, motion vector searches are carried out under highly effective manner of accessing the memories.

It is of course possible to combine the technique of the present invention with the fourth conventional technique. For example, motion vector distribution obtained in past searches may be analyzed to estimate the first reference vector to indicate the movement of the overall image, and at the same time, the second reference vector indicating the movement of the overall current target image is obtained according to the present technique. Next, searches are made in detail in the narrow areas centered about the first reference vector for all the templates in the target image and also in the narrow areas centered about the second reference vector for all the templates in the target image, so as to determine the displacement vector which has minimum sum of absolute value of differences in the displacement vectors relating to the first and second reference vectors.

The cost of obtaining the displacement vector is doubled in this method, but motion vectors can be determined more accurately.

The present invention presented in Embodiments 1-1~1-6 has an advantage that the search range can be expanded without increasing the cost of the apparatus and that a movement can always be detected when the movement is within the expanded area.

Further, even the first conventional method, the exhaustive search method, known to be the most sensitive method cannot avoid some erroneous detection. As the search area is expanded to improve the image quality of large movements, disparity among the motion vectors increases because of an increase in erroneous detection. Therefore, the present method provides an additional advantage that, when the reference vector to indicate the movement of the overall image is detected first, as explained in the present invention, and searches for motion vectors are made only in its vicinity, disparity among the motion vectors due to erroneous detection can be minimized, thus resulting in improving the image quality.

Next, the second method and apparatus for motion vector searching will be presented with reference to the drawings.

Embodiment 2-1

Figure 18:
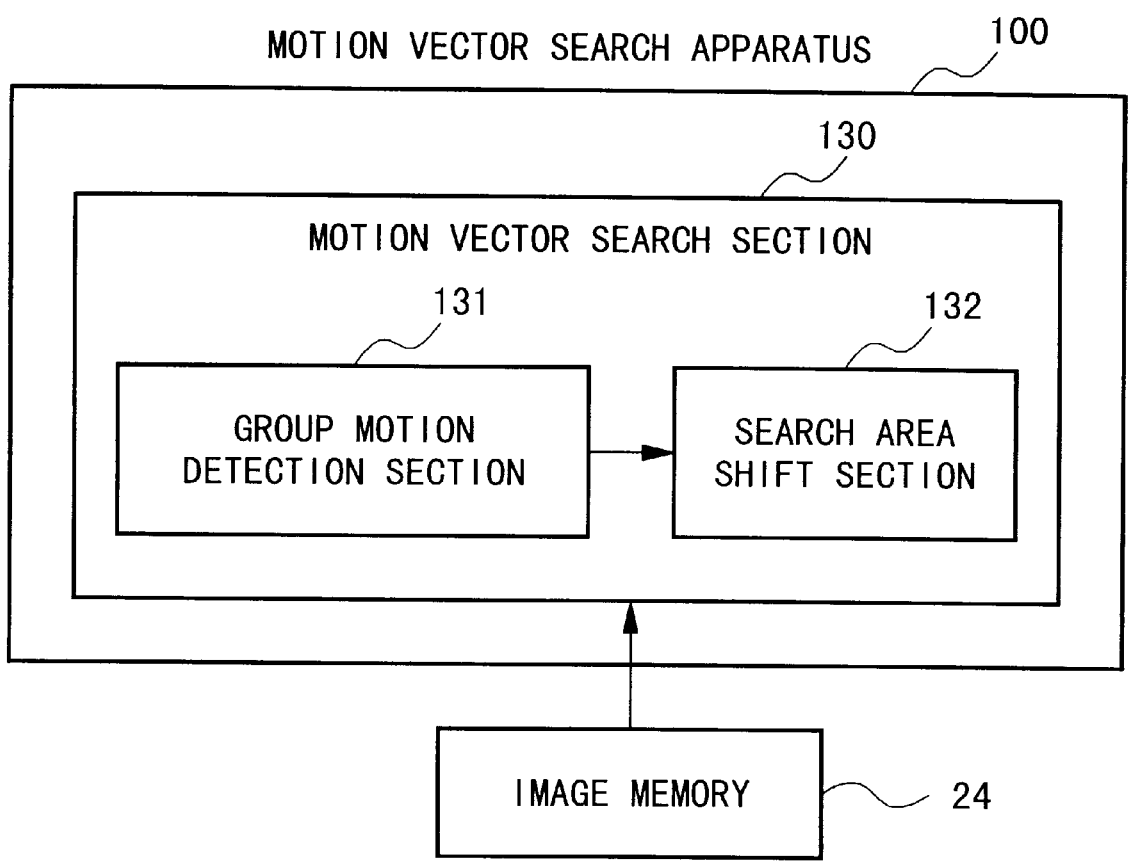
FIG. 18 is an example of the configuration of the motion vector search apparatus in Embodiment 2.

FIG. 18 shows a block diagram of a second motion vector search apparatus. The apparatus 100 is comprised by a motion vector search section 130, which is able to search a given search area of a constant area size. The motion vector search section 130 includes a group motion detection section 131 to evaluate a movement of a given number of templates (termed a template group hereinbelow), and a search area shift section 132. The group motion detection section 131 evaluates a movement of whole template group using a pre-determined evaluation function, and when a movement of the target template group is detected, the search area shift section 132 shifts the search area for a next template group according to the detected movement.

The shift amount is termed the reference vector in the following.

Also, the configuration of the apparatus shown in FIG. 18 applies to all the embodiments described in various examples in Embodiments 2-1~2-7.

Figure 19:
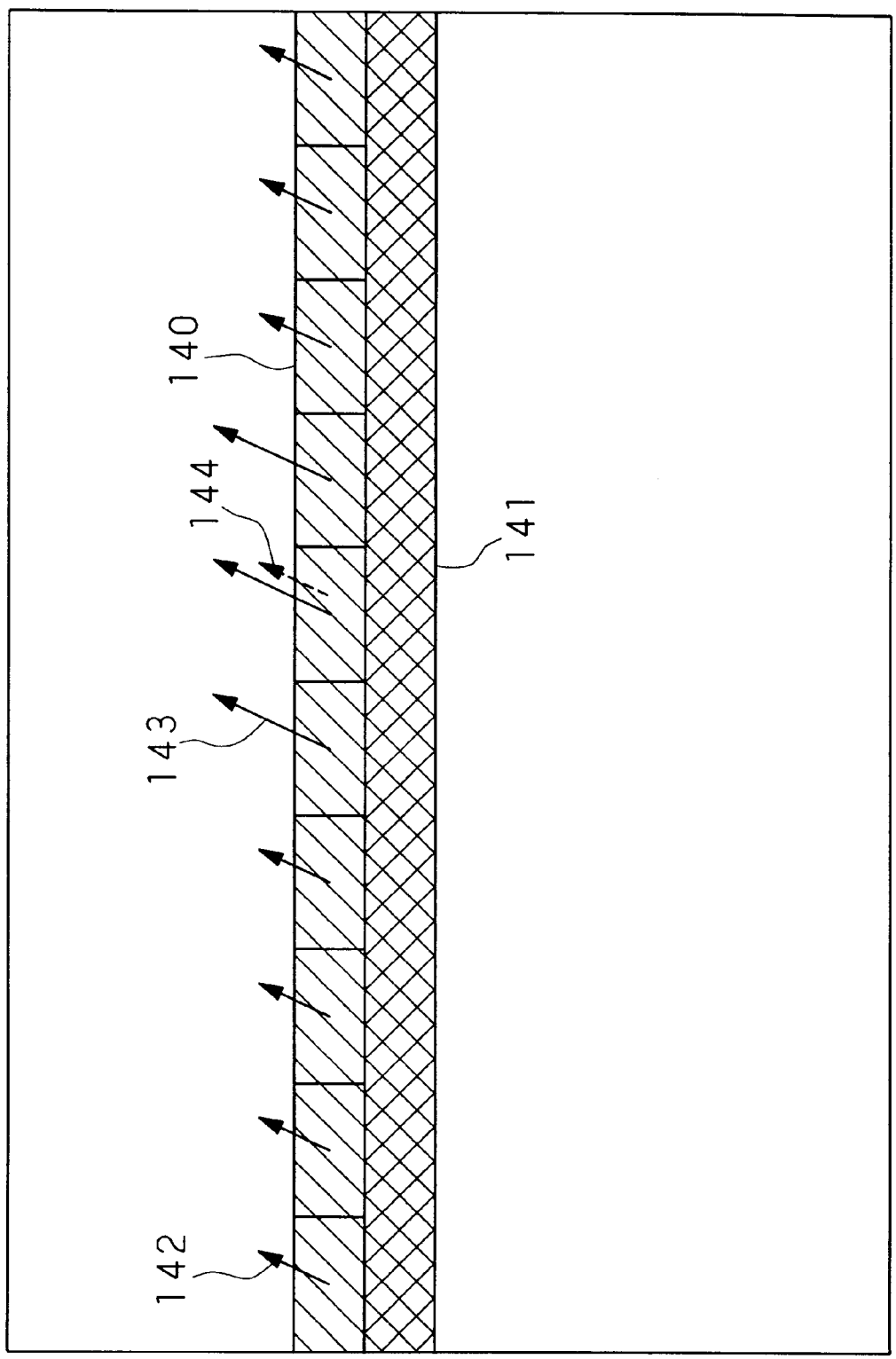
FIG. 19 is a schematic illustration of Embodiment 2.

FIG. 19 shows an example slice represented by a template group. One slice contains ten templates, and ten motion vectors are analyzed to obtain the movement of the slice 140, and this movement is used as the reference vector to decide where to shift the search area next. An example of such a function would provide a sum of absolute values of differences as the reference for obtaining a motion vector for each template group, and when the sum for each template in the template group is less than a pre-determined threshold value, a motion vector that appears most frequently is chosen as the movement of the template group.

In the example shown in FIG. 19, two kinds of motion vectors are found for the ten templates, one kind is a motion vector 142 and other kind is a motion vector 143. It can be seen that the motion vector 142 appears seven times but the motion vector 143 appears three times. In this case, the output will be the motion vector 142 as the movement 144 for slice 140 (whole template group). The example gives only two kinds for simplicity, but normally, individual vectors have slightly different sizes so that it would be necessary to analyze the distribution pattern of the motion vectors by using histograms and the like.

Figure 20:
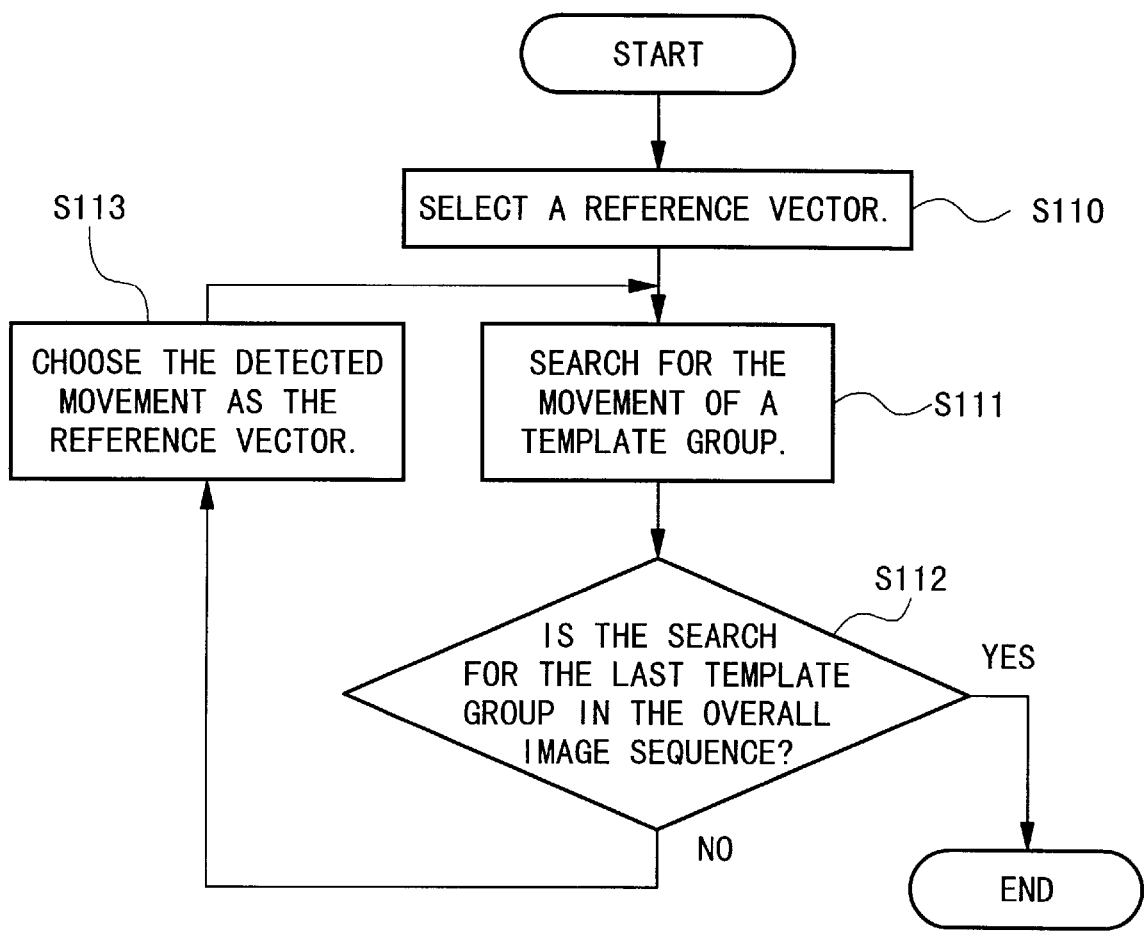
FIG. 20 is a flowchart showing the processing steps in Embodiment 2-1.

FIG. 20 is a flowchart of the processing steps in Embodiment 2-1.

First, the group motion detection section 130 selects a specific reference vector, for example the zero motion vector (0, 0) (step S110).

Next, the motion vector search section 130 selects a search conducted in areas centered about a block of the zero motion vector (0, 0) (step S111), and the motion vector for the template group detected according to the forgoing function is selected as the reference vector for the next template group (step S113). Subsequently, searches are continued using the motion vector for the current template group as the reference vector for the next template group, until the last template group in the overall image sequence is completed (step S112).

The flowchart shown in FIG. 20 will be further explained in detail.

First, the motion vector search section 130 selects a specific reference vector, for example the reference vector may be zero motion vector (0, 0) (step S110).

Next, the motion vector search section 130 processes the topmost (first) template group contained in the first image in the image sequence, by determining a motion vector for each template in the template group. This process will be explained chronologically in the following.

1) First, the motion vector search section 130 selects the first template (for example left edge template) in a template group for processing.
2) Next, the search area shift section 132 defines a search area for the selected template using the currently chosen reference vector as the shift amount.
3) The motion vector search section 130 obtains a motion vector (displacement vector) for the target template within the selected search area.
4) The motion vector search section 130 obtains an actual motion vector by adding the displacement vector for the target template and the current reference vector.
5) The motion vector search section 130 checks whether all the templates in the current given template group have been processed. If the processing is finished, the process moves to step S112, and if the processing is not finished, a next template in the current template group (right of the processed template) is selected, and the process returns to 2).

The above steps complete the processing in step S111.

After completing the processing in step S111, the motion vector search section 130 checks whether the bottom template group in the last image in the image sequence has been processed (step S112), and if the bottom template group in the last image is finished, the processing is completed.

If it is not finished, the group motion detection section 131 obtains a motion vector for the template group according to the evaluation function explained in FIG. 19, using the motion vectors for individual templates in the group obtained in step S111. And, the group motion detection section 131 chooses the motion vector for the template group as the reference vector for a next template group (step S113) and the process returns to step S111.

Next, in step S111, the motion vector search section 130 processes the next template group located at the top of the first image contained in the image sequence. The order of processing the template groups is from left to right and top to bottom, in view of memory access efficiency when processing according to reference standards of MPEG, for example.

By following the above procedure, the motion vector search apparatus chooses a motion vector for a preceding template group as the reference vector for searching a motion vector for each template in the following template group.

In this embodiment, when each template contained in a template group searches for a motion vector (step S111), an actual motion vector for the target template (equivalent to reference vector+displacement vector described in Embodiment 1-1), is obtained and using the actual motion vectors of all the target templates, a reference vector for the template group is calculated. This procedure is followed in all the following embodiments, Embodiments 2-1~2-5.

Embodiment 2-2

Reviewing Embodiment 2-1, the procedure used is incapable of altering the reference vector in response to, for example, a sudden change in the movements due to a change in the scene, which may lead to searching in areas unrelated to what is going on actually. For this reason, in Embodiment 2-2, when a movement of the whole template group is detected, the motion vector for the whole template group is output, but when a movement is not detected, a function is provided that give an alert that "movement is not detected". "Movement is detected" includes a case of no-motion, i.e., zero motion vector (0, 0), and "movement is not detected" means that a block to match the target template is not found in the search area.

An example of such evaluation functions would provide a sum of the absolute values of differences of the motion vectors as the reference for obtaining a motion vector for each template group, and when the sum for all templates is less than or equal to a pre-determined threshold value, a motion vector that appears most frequently is chosen as the movement of the template group. If there is even one template having sum of the absolute value of the differences exceeding the threshold value, the function outputs "movement is not detected".

In Embodiment 2-2, when a movement of a template group is not detected, the amount of shift in the search area for the next template group is adjusted, and a new reference vector, for example reference vector (0, 0) is selected.

Figure 21:
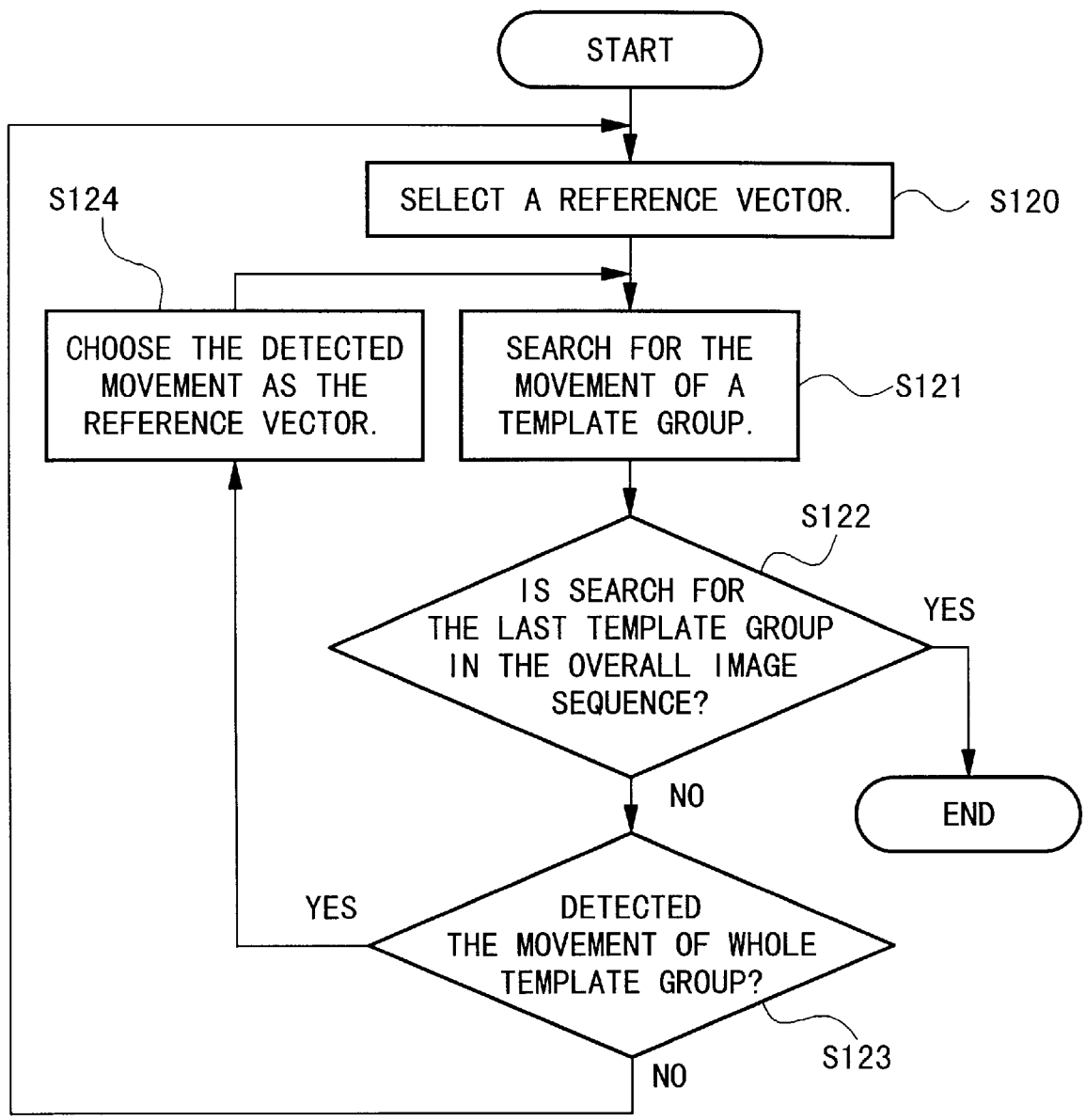
FIG. 21 is a flowchart showing the processing steps in Embodiment 2-2.

FIG. 21 shows a flowchart for processing steps in Embodiment 2-2. First, a specific reference vector, for example reference vector (0, 0), is selected (step S120), and searches are conducted in search areas centered about a block of zero motion vector (0, 0) (step S121). So long as movement is not detected, searches are continued in the search areas centered about the block of zero motion vector (0, 0). When a movement of the whole template group is detected according to the foregoing function (step S123), this motion vector is assigned as the reference vector for the next template group (step S124). Subsequently, searches are continued until the last template group is processed (step S122), by assigning a preceding motion vector as the reference vector for the next template group when movement is detected, and by resetting the reference vector for the next template group to the reference vector (0, 0) when movement is not detected.

As can be seen by comparing FIGS. 21 with 20, it can be seen that steps S120~S121 and S124 correspond to steps S110~S113, respectively.

Also, in this embodiment, step S123 is newly added in FIG. 20, in which the group motion detection section 131 determines a motion vector according to the foregoing evaluation function.

Embodiment 2-3

In Embodiment 2-3, when a movement of a template group cannot be detected, searches are continued until a template group that can detect a movement is found by altering the reference vector for each subsequent template group so as to search in a different range of search areas. In effect, a plurality of template groups searching for motion vectors means that search can be conducted in a wide search area.

Figure 22:
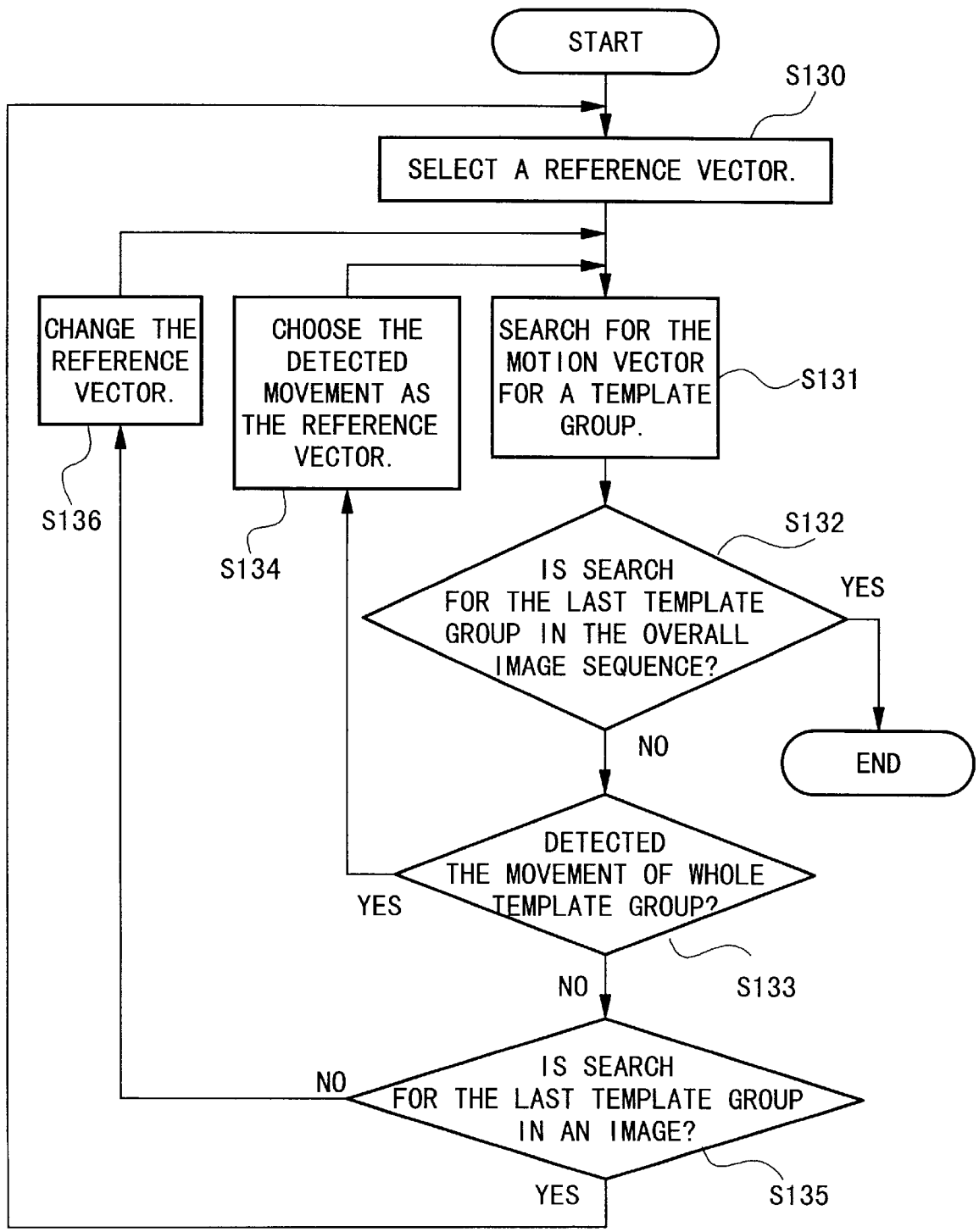
FIG. 22 is a flowchart showing the processing steps in Embodiment 2-3.

FIG. 22 shows processing steps in Embodiment 2-3. First, a specific reference vector, for example reference vector (0, 0), is selected (step S130), and searches are conducted in search areas centered about a block of zero motion vector (0, 0) (step S131). When a movement of the whole template group is detected (step S133), this motion vector is assigned as the reference vector for the next template group (step 134).

When a movement cannot be detected, a reference vector for the next template group is adjusted to a reference vector (x1, y1), excepting the reference vector (0, 0) (step S136), and searches are continued similarly for the next template group. If a movement of the whole template group is detected as a result of this search, searches are continued by assigning this motion vector as the reference vector for the next template group. If again a movement cannot be detected, the reference vector for the next template group is adjusted to a reference vector (x2, y2), excepting the vectors (0, 0) and (x1, y1), according to a pre-determined rule. If the processed template group is the last template group in the target image (step S135), the process returns to step S130, and a reference vector for the first processing template group in the next target image is reset to (0, 0).

The above steps are repeated until the last template group in the overall image sequence is processed (step S132).

As can be seen by comparing FIGS. 22 with 21, steps S130~S134 correspond to steps S120~S124, respectively.

Also, in this embodiment, steps S135, S136 are newly added to FIG. 21. Further, in step S135, the motion vector search section 130 checks whether the current template group is the last template group in the image being processed, and if it is the last template group, the process returns to step S130 to continue processing of next image in the image sequence. On the other hand, if it is not the last template group, the motion vector search section 130 selects a different reference vector, in step S135, according to the rule described earlier.

Embodiment 2-4

In Embodiment 2-4, initially, a plurality of searches are executed in a wide range of search areas by selecting suitable search areas such as the center area in an image, in order to determine a motion vector for the overall image,. When a motion vector for a template group is detected, further search is executed by assigning this vector as the reference vector. If a motion vector is not detected, a specific vector, for example the reference vector (0, 0) is selected for further searching.

Subsequently, so long as the movement of the whole template group is being detected, the detected motion vector is assigned as the reference vector for the next template group to continue searching. When the search is to be executed on the next image but the movement of the whole template group in the processed image cannot be detected, a new wide area search is executed according to the following procedure. Before initiating a search for the next image, a plurality of searches are executed using a different reference vector in suitable search areas, such as the center area in the image, to detect a motion vector of the overall image, and selecting this motion vector as the initial value of the reference vector for the next image.

Figure 23:
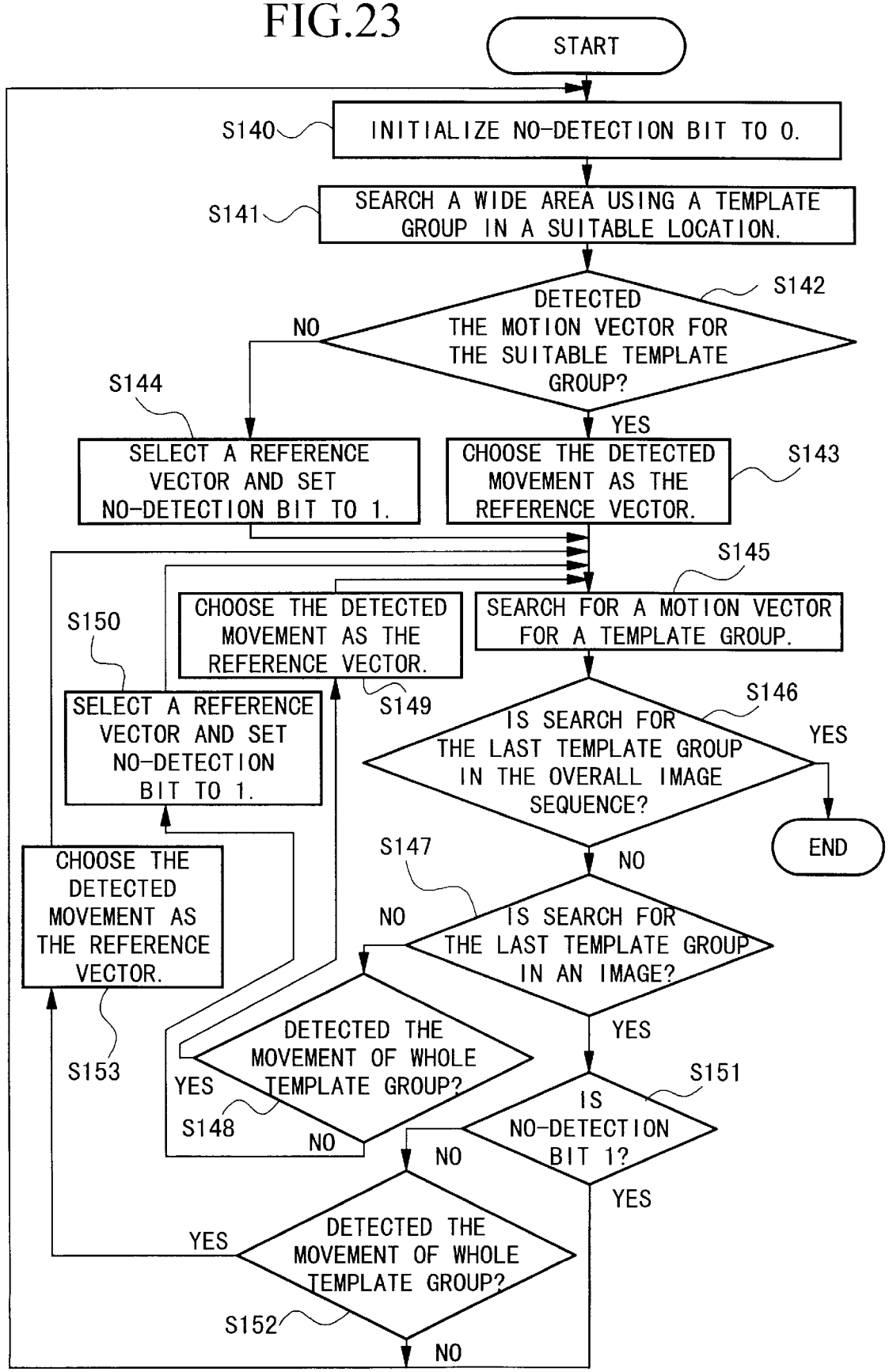
FIG. 23 is a flowchart showing the processing steps in Embodiment 2-4.

FIG. 23 is a flowchart for the processing steps in Embodiment 2-4. First, no-detection bit is initialized to 0, which indicates that a movement of the whole template group could not be detected in the target image in the image sequence (step S140).

Next, a plurality of searches for a motion vector is executed over a wide range of search areas by selecting a different reference vector for a template group located in an area suitable for searching a movement of the overall image, such as the center of an image (step S141).

This search step for a motion vector for the whole template group is substantially the same as repeating the steps S120, S121 in FIG. 21. However, there are two differences, one is to select different reference vectors successively in a process equivalent to step S120, according to a pre-determined rule, and the other is to change the location of template group successively in a process equivalent to step S121.

When a motion vector is detected in this search (step S142), this motion vector is chosen as the reference vector (step S143), and the search is executed for a motion vector for the template group (step S145). When a motion vector for a template group in a suitable location could not be detected, a specific reference vector, for example a reference vector (0, 0) is selected, and after no-detection bit is set to 1 (step S144), search is executed for a motion vector for the template group (step S145).

Here, judging criterion in step S142 is the same as that in step S123 in FIG. 21.

Also, in steps S140~S144, step S142 is processed by the group motion detection section 131, and selection of search area in steps S143, S144 is processed by the search area shift section 132. Other processing steps are carried out by the motion vector search section 130.

Until the search by the last template group in the overall image sequence is finished or the search by the last template group in an image is finished (step S146, S147), so long as movement of any template group is being detected (step S148), detected movement is assigned as the reference vector for the next template group (step S149). When the movement of any template group cannot be detected, a specific reference vector is selected, and no-detection bit is set to 1 (step S150), and search is continued for a motion vector for the template group (step S145).

When the search by the last template group in the target image is finished (step S147), the process checks whether the no-detection bit is 1 (step S151), and if the no-detection bit is 1, it returns to step S140 to repeat the same steps for the next image. If the no-detection bit is 0, depending on whether or not the movement of the whole template group is detected (step S152), and if it is detected, the detected movement is assigned as the reference vector in step S153, and search for a motion vector for the template group is continued (step S145). If a motion vector for the whole template group cannot be detected, the process returns to step S140.

Above steps are repeated until the search by the last template group is finished for the overall image sequence, then the search process is completed (step S146).

As can be seen by comparing FIGS. 23 and 22, steps S145, S146 correspond respectively to steps S131, S132. Steps S148, S149 correspond respectively to steps S133, S134, and steps S152, S153 also correspond respectively to steps S133, S134. Steps S147, S150 correspond respectively to steps S135, S136. However, step S150 also processes the no-detection bit.

In this embodiment, steps S140~S144 correspond to processing in step S130 in FIG. 22. In this case, when a movement of the whole template group cannot be detected in any one of the template groups in the immediate preceding target image, it means a low continuity of movement of the templates between the two images, and therefore, it is not proper to use the reference vector that is determined from the immediate preceding image. For this reason, the motion vector search section 130 uses a portion of the target image to obtain an initial reference vector in steps S140~S144, and selects this reference vector.

On the other hand, when a movement of the whole template group can be detected in all the template groups in the preceding target image, it means a high degree of continuity in the template movements between the images. Therefore, the motion vector search section 130 selects the reference vector detected in step S153 as the reference vector for the target image.

Processing of each template group in the target image is carried out in steps S145~S153.

In step S141, an example of a suitable location of a template group was illustrated by the center area in the target image. It may be considered that a central area is preferable for obtaining a motion vector for movement of an overall image, but the choice is not restricted to this location.

For example, in step S141 for choosing a suitable template group, the left edge template of the target image (the first template group in the image to be processed) contained in the upper-most slice in the target image may be chosen. In this case, if the motion vector search section 130 predetermines the motion vectors of each template in the template group in step S141, the first template group to be processed in step S145 will be the next template group to the template group processed in step S141. Such a procedure would shorten the processing effort, and can execute memory access more efficiently.

Also, to simplify the processing procedure while reflecting the processing results from the preceding image, steps S141~S143 may be omitted, and step S144 may be used only to select a specific reference vector.

Embodiment 2-5

Embodiment 2-5 is based on modifying Embodiment 2-1~2-4 to include all the templates within one slice in one common template group. In other words, a template group in this embodiment is comprised by one slice or a plurality of slices.

If the templates belonging to one slice is allowed to be contained in a different template group, the fifth conventional technique cannot be used when a search step is transferring from one template group to a next template group, causing transfer of extra pixels in the search area. An example will be presented with reference to FIG. 24.

Figure 16:
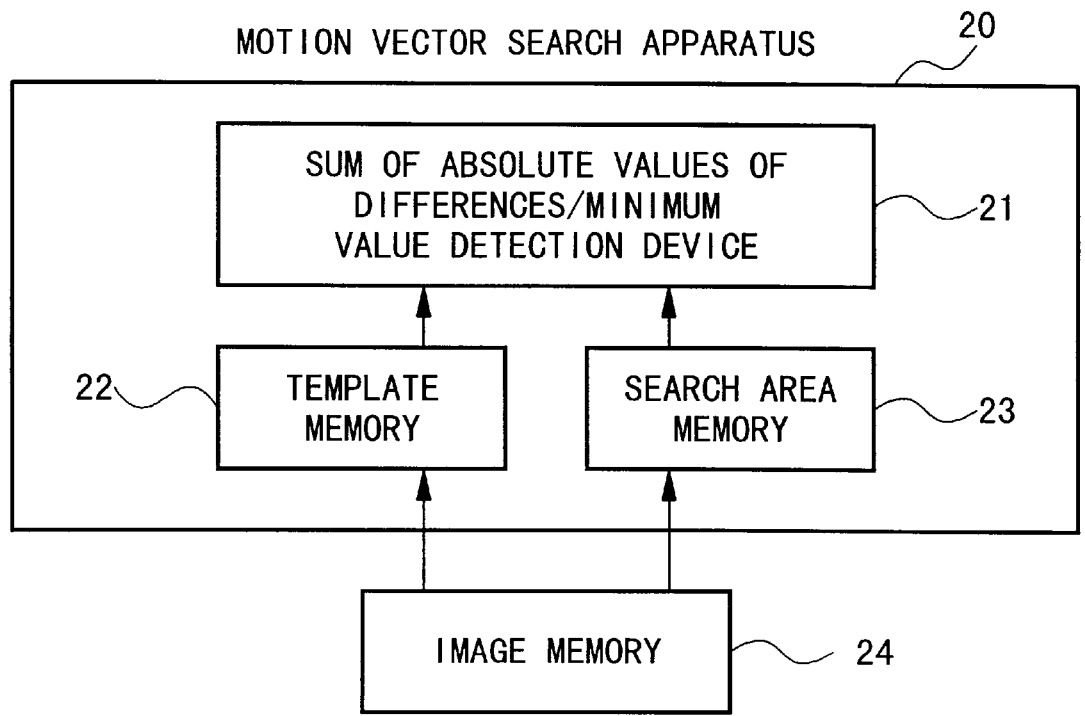
FIG. 16 is a block diagram of a typical configuration of conventional motion vector search apparatuses.

In this example, left half templates and right half templates within the same slice are contained in different template groups, resulting that the reference vector for the template group 150 (left half templates) are different than the reference vector for the template group 151 (right half templates). As seen FIG. 24, designating the reference vectors for the template groups 150, 151 as reference vectors 153, 156, respectively, the search area is 154 for the last template 152 of template group 150 and the search area is 157 for the first template 155 of template group 151. When the search areas 154, 157 are offset as illustrated in the drawing, the fifth conventional technique cannot be applied, and almost all the pixels in the search area 157 must be transferred from the image memory 24 to search area memory 23 which was explained in FIG. 16, causing the need for transfer of extra pixels.

Embodiment 2-5 is configured so that all the templates within one slice is contained in a common group to avoid the problem discussed above.

Figure 24:
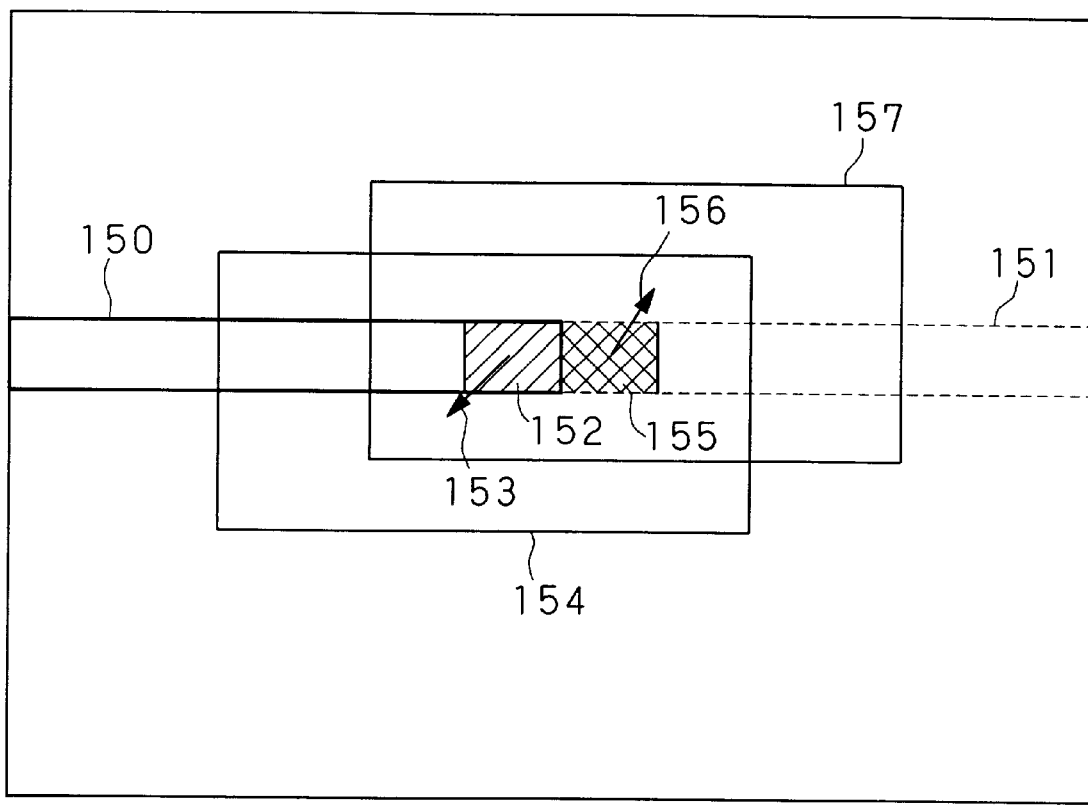
FIG. 24 is a flowchart showing the processing steps in Embodiment 2-5.

Because the order of processing the video encoding is from left to right and top to bottom of an image, when encoding to international reference standards such as MPEG1 or MPEG2, therefore, it is preferable that the slices are horizontal as shown in FIG. 24.

Embodiment 2-6

In Embodiment 2-6, when a movement of the whole template group is detected, the detected movement is assigned as the reference vector, and when a movement of the whole template group cannot be detected, a reference vector is varied for each template group to search for a motion vector in different ranges of search areas, until a movement can be detected from subsequent template groups. However, before executing a search for a movement in the next template group, distribution of motion vectors of encoded video images is analyzed to estimate the movement of the next template group. Next, the probability of correctness of the estimated movement is evaluated, and if it is judged to be high, reference vector is changed to the estimated movement. Method that may be used to judge the correctness of estimated movement is to compare the movement of the detected template groups in the current image with the movement of the corresponding template groups in the immediate preceding image, and if they match, estimated movement is judged to be correct but, even if one template group exhibits a different behavior, the estimated movement is judged to be incorrect.

Figure 25:
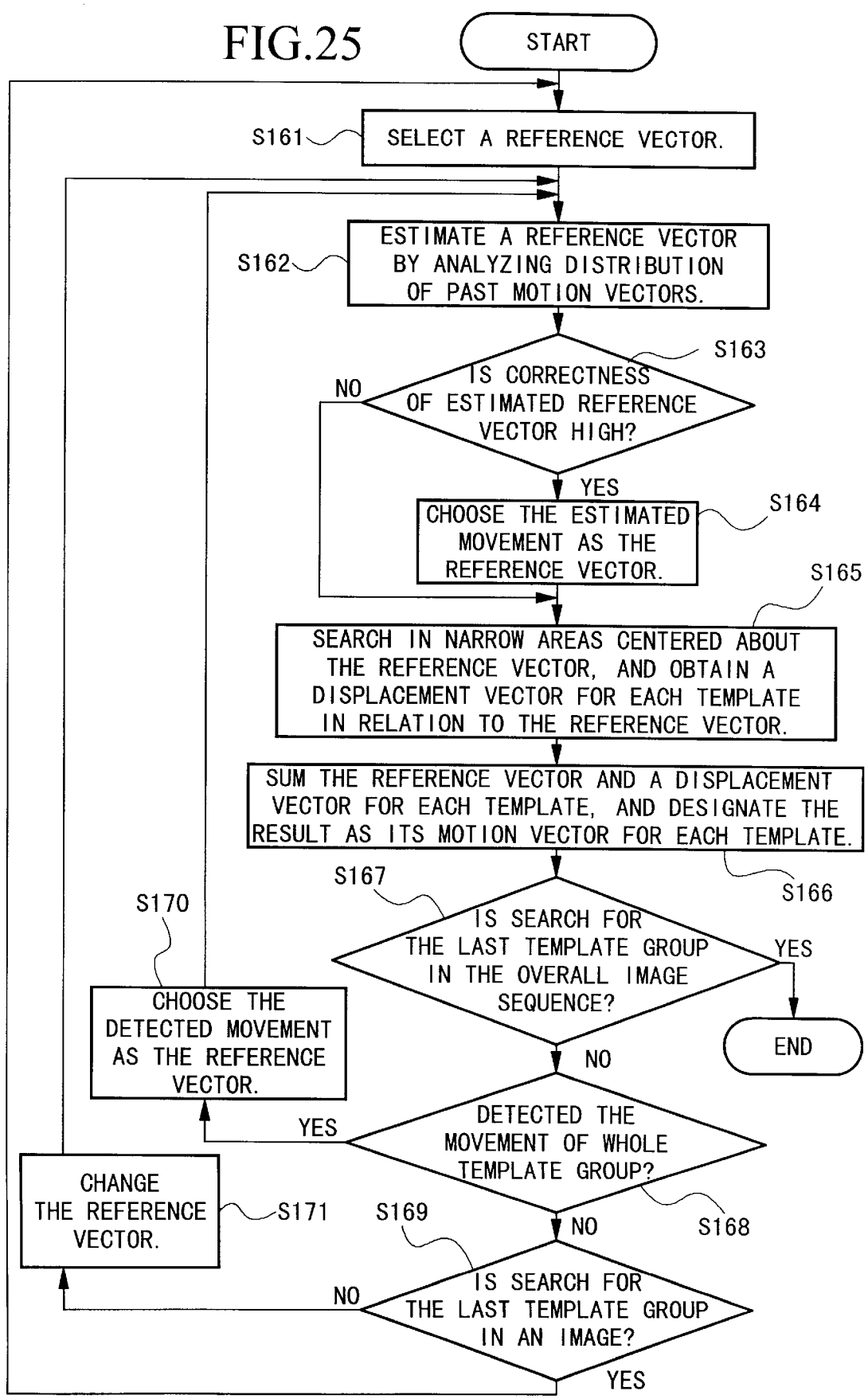
FIG. 25 is a flowchart showing the processing steps in Embodiment 2-6.

FIG. 25 shows a flowchart of the processing steps in Embodiment 2-6.

First, the motion vector detection section 130 selects a specific reference vector, for example the reference vector (0, 0) (step S161).

Next, the motion vector detection section 130, excepting the template groups contained in the first image in the image sequence to be processed, analyzes the distribution of motion vectors in the encoded past images before searching for movement of the template groups, so as to estimate a movement of the template group (step S162). Estimation method is as described above.

Next, the motion vector detection section 130 judges whether the probability of estimated movement being correct is high or low (step S163) using the method mentioned above, and if the probability is high, the reference vector is changed to the estimated movement (step S164).

Here, the first image to be searched does not have historical data. Therefore, the motion vector detection section 130 judges that the estimated movement is in error, and skips step S164.

Next, the motion vector detection section 130 selects and searches narrow search areas centered about the reference vector to obtain a displacement vector within the search area for each of the templates contained in the template group (step S165).

Next, the motion vector detection section 130 calculates individual motion vectors by obtaining a sum of the reference vector and the individual displacement vectors obtained (step S166).

Next, the motion vector detection section 130 checks whether the processed template group is the last template group in the target image in the image sequence (step S167), and if it is the last template group, the process is completed.

If it is not the last template group, the group motion detection section 131 detects a movement of the whole template group using the individual motion vectors obtained in step S166, according to the method explained earlier (step S168). At this time, the group motion detection section 131 stores the data relating the detected motion vectors and the location of the template groups in memory (not shown), for the purpose of analyzing the motion vectors in step S162.

When a movement of the whole template group is detected in step S168, the motion vector detection section 130 selects the motion as the reference vector for the next template group (step S170), and the process proceeds to step S162.

When a movement of the whole template group could not be detected, the motion vector detection section 130 selects a reference vector for the next template group, according to a pre-determined rule, and a reference vector (x1, y1), excepting the reference vector which have been selected (step S171), is selected and the process proceeds to step S162. If again a movement could not be detected, a reference vector for a next template group is adjusted to a reference vector (x2, y2), excepting the vectors (0, 0) and (x1, y1) selected already according to a pre-determined rule. When the last template group in the target image is processed (step S169), the motion vector detection section 130 proceeds to step S161, and processing is executed on the next image in the image sequence.

Here, comparing FIG. 25 with FIG. 22, it can be seen that step S161 corresponds to step S130. Steps S165, S166 are steps included in step S131. Steps S167~S171 correspond respectively to steps S132~S136.

The difference between FIGS. 25, 22 is found in steps S162~S164. These steps enable the motion vector detection section 130 to select reference vectors reflecting the motion vectors obtained from historical encoded video images.

More concretely, the following effect can be obtained. For example, when a train is moving in the bottom half of a scene, and the upper half is the background, their movements are different. So, a simple assigning of a motion vector for an immediate preceding template group as the reference vector for a next template group is not sufficient to describe the movement of template groups at the boundary between the background and the train. In such a case, motion vectors of the templates contained in the template groups cannot be detected with sufficient accuracy. In this embodiment, selection of reference vectors are aided by the use of estimated reference vectors obtained from a distribution of motion vectors in historical encoded video images (step S162~S164), therefore, these steps can be applied to the template groups in the boundary between the background and the train to obtain appropriate reference vectors. The result is a precision technique of detection of motion vectors for individual templates.

In this embodiment also, all the templates within one slice are included in one common template group, as explained in Embodiment 2-5, so that motion vector searches are carried out under highly effective manner of memory access.

Embodiment 2-7

Embodiment 2-7 includes a telescopic search capability in the motion vector search apparatus presented to this point. First, telescopic search will be explained.

In video encoding process, motion vectors are sometimes obtained from an image in several preceding images. A method used in such a case is to first obtain a motion vector between two adjoining images, and this motion vector is used as the initial value to obtain a motion vector for the succeeding adjoining image, and this process is repeated to obtain a motion vector between images separated over a long time interval. This method is termed the telescopic search method. Because movements between adjoining images are relatively small, telescopic search method enables to detect movements over a smaller search area relative to searching in two images separated by a long time interval.

Figure 26:
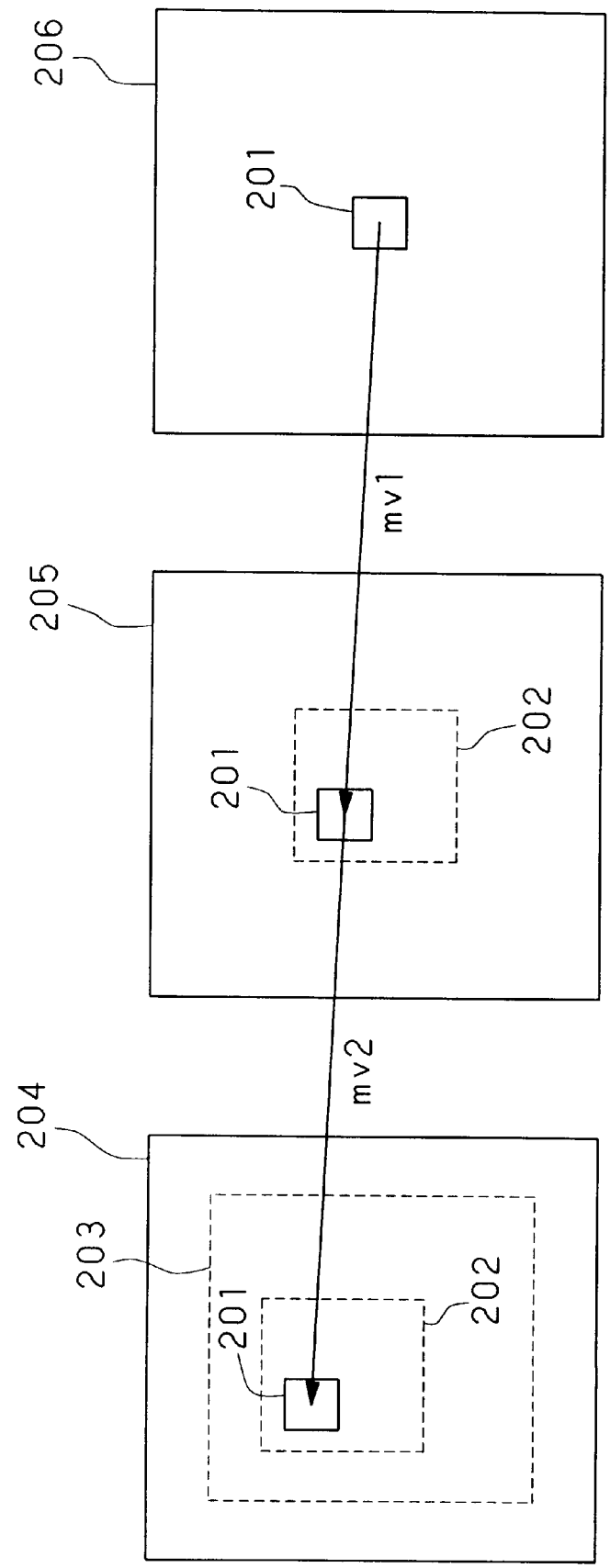
FIG. 26 is an illustration of telescopic search technique.

Telescopic search method will be explained with reference to a schematic diagram shown in FIG. 26.

Images 204, 205, 206 are three contiguous images (frames). The image 206 represents a current image, and the images 205 and 204 represent a one-frame preceding image and a two-frame preceding image, respectively. A rectangular block 201 is moved between the image (frames) 206, 205 with a moving vector mv1, and between the images 205, 204, the block 201 is moved with a moving vector mv2. Therefore, a moving vector between images 206, 204 is given by (mv1+mv2).

In the telescopic search method, a motion vector mv1 for a movement in image 206 to image 205 is obtained by using the block 201 in image 206 as the template and searching in search area 202 in image 205. In this case, the motion vector of the center of area 202 is given by (0, 0). Next, the area 202 in image 204 is searched to obtain a motion vector mv2. The motion vector for the block 201 from image 206 to image 205 indicate that the motion vector of the center of area 202 in image 204 will be mv1.

Here, let us designate the horizontal component and the vertical component of motion vector mv1 by $mv1_x$ and $mv1_y$, and designate the allowable ranges for these components by $-a \leq mvx1_x \leq a$, and $-b \leq mv1_y \leq b$, respectively. Similarly, let us designate the horizontal component and the vertical component of motion vector mv2 by $mv2_x$ and $mv2_y$, and designate the allowable ranges for these components by $-a \leq mv2_x \leq a$, and $-b \leq mv2_y \leq b$, respectively.

In this case, allowable ranges for the motion vector (mv1+mv2) are, respectively, $-2a \leq mv1_x+mv2_x \leq 2a$, and $\leq 2b \leq mv1_y+mv2_y \leq 2b$. It can be seen that, in the telescopic search method, the farther apart the images are in time the larger the allowable area, in other words, allowable search area becomes larger. This is indicated in FIG. 26 so that in image 205 separated from image 206 by one frame, search can be executed over an area 202, but in image 204 separated from image 206 by two frames, search can be executed over a larger area 203.

A method of combining the telescopic method with the second conventional technique is found in, for example, "A real-time motion estimation and compensation LSI with wide search range for MPEG2 video encoding" by K. Suguri et. al., IEEE J.Solid-State Circuits, vol. 31, no. 11, pp.1733~1741, Nov. 1966.

In this embodiment, search areas that may be referenced in Embodiments 2-1~2-6 are stored in search area memory (not shown) of the motion vector search apparatus shown in FIG. 18. For example, for the telescopic search method, area 202 in image 205 and area 203 in image 204 shown in FIG. 26 are stored in search area memory.

In Embodiments 2-1~2-6, the motion vector search apparatus used in these embodiments was not capable of executing the telescopic search method, when search area memory was made to store only the actual search areas in the search area memory. However, when the potential search areas, that may be referenced, were stored in the search area memory of the apparatus, it was possible to utilize the telescopic method to search for a motion vector in a restricted search area, having high probability, even though the potential area of finding a motion vector extends over a wide area.

As explained above, the second method of motion vector search method and apparatus enable to expand the search area without increasing the cost for the apparatus, and to ensure finding a motion vector if it exists within the expanded search area, and also enables to alter the amount of shifting a search area to reflect the result of searches over a portion of the search area.

In view of the fact that erroneous detection of motion vector cannot be avoided even when the exhaustive search method, known as be the most precise first conventional method, is used. Therefore, if an expanded search is carried out using this method in order to produce a higher quality in an image portraying large movements, erroneous detection increases and, consequently, disparity among the motion vectors is increased. Such problems are resolved in the present invention by evaluating a movement of a certain number of templates, shifting a search area for the next template group according to the results of the movement of the whole template group, and searching in detail for a motion vector in the shifted area. This approach minimizes disparity in the detected motion vectors, thereby producing higher quality images.

The search methodologies employed in foregoing embodiments (Embodiments 1-1~1-6, and Embodiments 2-1~2-7) for detecting motion vectors can be recorded as application programs in a computer-readable memory medium, and can be applied in solving problems of motion vector search, by using a computer system to read such programs. In this context, a computer system includes any operating systems (OS) and peripheral hardwares that are connected (remotely or directly) to the computer system. Computer-readable recording media include portable media such as floppy disks, opto-magnetic disks, ROM, CD-ROM, as well as fixed devices such as hard disks housed in computer systems. Computer-readable memory media further include short-term dynamic memories (transmission media inclusive of wave signals) used in transmitting applications through such means as networks such as Internet or telephone line network, as well as other short-term memories such as volatile memories used in servers and client computer systems.

Application programs may perform a part of the described functions, or may be operated in conjunction with pre-recorded programs stored in computer systems to provide differential files (differential programs).

It is obvious that the disclosed procedures can be executed by hardware only by manufacturing custom semiconductor devices.

The foregoing embodiments presented with reference to the drawings are for illustrative purposes only, and are not meant to be restrictive, and it is clear that many design modifications may be made without departing from the basic principle of rapid search for a motion vector based on the technique of first searching in a wide area to find the reference vector followed by searches in narrow areas to find displacement vectors, thereby obtaining a motion vector in two adjacent images, as disclosed in the following claims.

What is claimed is:

1. A method for motion vector searching to obtain a motion vector of each template according to computational results of matching a target template in a target image and a pixel block in a reference image having a same size as said target template, comprising the steps of:

1) searching in a wide area in said referenced image and obtaining a reference vector to indicate an overall movement of said target image;

2) searching in a narrow area in said reference image centered about said reference vector for every template in said target image, and obtaining a displacement vector in relation to said reference vector for each template; and 3) summing said reference vector and said displacement vector for each template, and assigning a computed result as a motion vector for a respective template.

2. A method according to claim 1, wherein, to obtain a motion vector between said target and reference images, which are time-separated images and containing a plurality of contiguous images:

in said step 1, obtaining each motion vector indicating an overall movement between two adjacent contiguous images, summing said motion vectors, and assigning a resulting sum as a reference vector between said target and reference images; and in said step 2, searching in narrow areas in said reference image centered about said reference vector for every template in said target image, and obtaining a displacement vector in relation to said reference vector for each template.

3. A method according to claim 1, wherein:

in said step 1, preparing reduced images having low resolution from said target and reference images by sub-sampling a high resolution image directly or by low-pass filtering a high resolution image, and searching for a reference vector to indicate an overall image movement using said reduced images; and in said step 2, obtaining a displacement vector in relation to said reference vector for each template using said target and reference images having high resolution.

4. A method according to claim 2, wherein:

in said step 1, preparing reduced images having low resolution from said target and reference images by sub-sampling a high resolution image directly or by low-pass filtering a high resolution image, and searching for a reference vector to indicate an overall image movement using said reduced images; and in said step 2, obtaining a displacement vector in relation to said reference vector for each template using said target and reference images having high resolution.

5. A method according to claim 1, wherein:

in said step 1, obtaining a reference vector, by using only those templates, required to describe an overall image movement, selected from a lesser number of templates than a total number of templates in said target image; and, in said step 2, searching in narrow areas in said reference image centered about said reference vector for every template in said target image, and obtaining a displacement vector in relation to said reference vector for each template.

6. A method according to claim 2, wherein:

in said step 1, obtaining a reference vector, by using only those templates, required to describe an overall image movement, selected from a lesser number of templates than a total number of templates in said target image; and, in said step 2, searching in narrow areas in said reference image centered about said reference vector for every template in said target image, and obtaining a displacement vector in relation to said reference vector for each template.

7. A method according to claim 5, wherein:

in said step 1, obtaining a reference vector to indicate an overall image movement by repeatedly shifting narrow search areas in said reference image so as to search in a wide area; and in said step 2, searching in narrow areas in said reference image centered about said reference vector for every template in said target image, and obtaining a displacement vector in relation to said reference vector for each template.

8. A method according to claim 6, wherein:

in said step 1, obtaining a reference vector to indicate an overall image movement by repeatedly shifting narrow search areas in said reference image so as to search in a wide area; and in said step 2, searching in narrow areas in said reference image centered about said reference vector for every template in said target image, and obtaining a displacement vector in relation to said reference vector for each template.

9. A method according to claim 5, wherein:

for obtaining a reference vector to indicate an overall image movement, said step 1 includes steps of:

selecting a search area described by shifting a search center over a given amount of pixels from a zero motion vector (0, 0) for all target templates contained in a specific slice of said target image;

starting search from an edge template in said specific slice;

when search in said specific slice is finished, shifting said search center by a different amount of pixels from said zero motion vector (0, 0);

repeating same search steps for the target templates for obtaining a motion vector for each target template of said specific slice in said wide area; and if necessary repeating same search steps for other slices for obtaining a motion vector; and in said step 2, searching in narrow areas in said reference image centered about said reference vector for every target templates in said target image, and obtaining a displacement vector in relation to said reference vector for each template.

10. A method according to claim 6, wherein:

for obtaining a reference vector to indicate an overall image movement, said step 1 includes steps of:

selecting a search area described by shifting a search center over a given amount of pixels from a zero motion vector (0, 0) for all target templates contained in a specific slice of said target image;

starting search from an edge template in said specific slice;

when search in said specific slice is finished, shifting said search center by a different amount of pixels from said zero motion vector (0, 0);

repeating same search steps for the target templates for obtaining a motion vector for each target template of said specific slice in said wide area; and if necessary repeating same search steps for other slices for obtaining a motion vector; and in said step 2, searching in narrow areas in said reference image centered about said reference vector for every target templates in said target image, and obtaining a displacement vector in relation to said reference vector for each template.

11. A method for motion vector searching using a constant search area by shifting a potential search area in a reference image, comprising the steps of:

1) evaluating a movement of a whole template group containing a specific number of templates in a target image, and outputting a detected movement when an overall movement of a whole template group is detected or outputting a no-detection indicator when an overall movement is not detected;

2) shifting a search center of a next template group in said target image according to said detected movement when said overall movement is detected; and 3) assigning a specific motion vector to a center block in a search area to be searched by a next template group in said target image when said overall movement is not detected.

12. A method according to claim 11, wherein, in said step 3, when said overall movement is not detected, a shifting amount of a search area is adjusted for the next template group, and said center block in a search area is a block described by an adjusted motion vector.

13. A method according to claim 11, wherein, in said step 3, when said overall movement is not detected, search is continued by changing a reference vector to indicate a search area shift for each template group, until a template group is found that can detect said overall movement.

14. A method according to claim 11, wherein, said method includes a further steps of:

before starting a search in an initial image, selecting a template group located in a location suitable for detecting an overall movement of said initial image, and repeatedly shifting search area to different search areas so as to detect a motion vector for an overall movement in a wide area, when an overall movement is detected, a search area of a first template group in said initial image is shifted according to a detected movement, and when an overall movement is not detected, a search area of the first template group is shifted according to a specific reference vector; and in said step 3, when said overall movement is not detected, assigning a specific motion vector until a template group can detect said overall movement, or a last template group in said target image has been used, and before starting a search in a next target image, repeatedly shifting a search area of a template group located in a location suitable for detecting an overall movement of said next target image to different search areas so as to detect a motion vector for an overall movement in a wide area, and shifting a search area of a first template in said next image according to said motion vector.

15. A method according to claim 11, wherein:

in said step 2, when an overall movement of a whole template group is detected, an amount to be shifted for a next template group is determined and shifted according to the detected movement and movements detected in past searches; and in said step 3, when an overall movement of a whole template group is not detected, an amount to be shifted for a next template group is determined and shifted according to a selected movement and a movement detected in past searches.

16. A method according to claim 12, wherein, in said step 1, when even one template that does not have match block in a search area is found in the search of each template, outputting said no-detection indicator.

17. A method according to claim 13, wherein, in said step 1, when even one template that does not have match block in a search area is found in the search of each template, outputting said no-detection indicator.

18. A method according to claim 14, wherein, in said step 1, when even one template that does not have match block in a search area is found in the search of each template, outputting said no-detection indicator.

19. A method according to claim 15, wherein, in said step 1, when even one template that does not have match block in a search area is found in the search of each template, outputting said no-detection indicator.

20. A method according to claim 11, wherein, all templates in one slice are contained in one template group.

21. A motion vector search apparatus for obtaining a motion vector of each template according to computational results of matching a target template in a target image and a pixel block in a reference image having a same size as said target template, comprising:

a first search section for searching in a wide area in said referenced image and obtaining a reference vector to indicate an overall movement of said target image; and a second search section for searching in a narrow area in said reference image centered about said reference vector for every template in said target image, obtaining a displacement vector in relation to said reference vector for each template, summing said reference vector and said displacement vector for each template, and assigning a computed result as a motion vector for a respective template.

22. An apparatus according to claim 21, wherein said apparatus is provided with a narrow area search section serving as said first search section and said second search section, and wherein:

said first search section performs a plurality of searches in different narrow search areas using said narrow area search section, and thereby searching a wide area to obtain a reference vector; and said second search section performs searches in narrow search areas centered about said reference vector for each template in said target image using said narrow area search section to obtain a displacement vector.

23. A motion vector search apparatus for searching a motion vector by repeated searches in a specific search area, comprising:

a first processing section for evaluating a movement of a whole template group containing a specific number of templates in a target image, and outputting a detected movement when an overall movement of a whole template group is detected or outputting a no-detection indicator when an overall movement is not; and a second processing section for shifting a search center of a next template group in said target image according to said detected movement when said overall movement is detected, or assigning a specific motion vector to a center block in a search area to be searched by a next template group in said target image when said overall movement is not detected.

24. A computer program product containing a computer readable program recorded on a computer usable medium for causing a computer to obtain a motion vector of each template according to computational results of matching a target template in a target image and a pixel block in a reference image having a same size as said target template, said computer program effecting the process of:

searching in a wide area in said referenced image and obtaining a reference vector to indicate an overall movement of said target image;

searching in a narrow area in said reference image centered about said reference vector for every template in said target image, and obtaining a displacement vector in relation to said reference vector for each template; and summing said reference vector and said displacement vector for each template; and assigning a computed result as a motion vector for a respective template.

25. A computer program product containing a computer readable program recorded on a computer usable medium for causing a computer to search a motion vector by repeated searches in a specific search area, said computer program effecting the process of:

evaluating a movement of a whole template group containing a specific number of templates in a target image, and outputting a detected movement when an overall movement of a whole template group is detected or outputting a no-detection indicator when an overall movement is not detected;

shifting a search center of a next template group in said target image according to said detected movement when said overall movement is detected; and assigning a specific motion vector to a center block in a search area to be searched by a next template group in said target image when said overall movement is not detected.

* * * * *